(12) United States Patent
Kato et al.

(10) Patent No.: US 7,356,218 B2
(45) Date of Patent: Apr. 8, 2008

(54) VARIABLE DEMULTIPLEXER

(75) Inventors: Yoshimichi Kato, Matsubara (JP); Toshiyuki Okumura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/292,973

(22) Filed: Dec. 2, 2005

(65) Prior Publication Data
US 2006/0120665 A1    Jun. 8, 2006

(30) Foreign Application Priority Data
Dec. 2, 2004    (JP)    ............................. 2004-350088

(51) Int. Cl.
*G02B 6/28* (2006.01)
(52) U.S. Cl. ...................................... 385/24
(58) Field of Classification Search ................. 385/14, 385/24, 129, 132, 122, 131
See application file for complete search history.

(56) References Cited

U.S. PATENT DOCUMENTS

| 7,058,263 | B2 * | 6/2006 | Welch et al. ................. 385/37 |
| 2003/0031445 | A1 * | 2/2003 | Parhami et al. ............. 385/129 |
| 2003/0040134 | A1 * | 2/2003 | Deliwala ...................... 438/22 |
| 2005/0128592 | A1 * | 6/2005 | Nishii et al. ................. 359/573 |
| 2005/0146778 | A1 * | 7/2005 | Noda et al. .................. 359/321 |
| 2006/0050744 | A1 * | 3/2006 | Wong et al. ..................... 372/3 |
| 2006/0251368 | A1 * | 11/2006 | Kittaka et al. .............. 385/125 |

FOREIGN PATENT DOCUMENTS

JP    2003-043277 A    2/2003
JP    2003-255160 A    9/2003

OTHER PUBLICATIONS

U. Peschel et al. (Nov. 1, 1988/vol. 23, No. 21) "Optical Bloch oscillation in waveguide arrays" Optics Letters.*
Morandotti, R. et al. (Dec. 6, 1999). "Experimental Observation of Linear and Nonlinear Optical Bloch Oscillations," *Physical Review Letters* 83(23):4756-4759.
Peschel, U. et al. (Nov. 1, 1998). "Optical Bloch Oscillations in Waveguide Arrays," *Optics Letters* 23(21):1701-1703.

* cited by examiner

*Primary Examiner*—Brian Healy
*Assistant Examiner*—Hung Lam
(74) *Attorney, Agent, or Firm*—Morrison & Foerster LLP

(57) ABSTRACT

A small variable demultiplexer capable of improving yield and stabilizing characteristics can be obtained. The small variable demultiplexer includes an $SiO_2$ layer serving as a base medium, a waveguide array, a heater serving as an external refractive index modulating unit and a heat sink serving as the external refractive index modulating unit. The waveguide array is arranged on the $SiO_2$ layer. The waveguide array is formed of the plurality of Si photonic wire waveguides serving as waveguides. The heater and the heat sink provide a refractive index gradient which is formed in the direction perpendicular to the extension direction of the Si photonic wire waveguide, and is variable depending on the plurality of Si photonic wire waveguides. The Si photonic wire waveguide has a one-dimensional photonic crystal structure in the extension direction of the Si photonic wire waveguide.

8 Claims, 22 Drawing Sheets

VARIABLE DEMULTIPLEXER

This nonprovisional application is based on Japanese Patent Application No. 2004-350088 filed with the Japan Patent Office on Dec. 2, 2004, the entire contents of which are hereby incorporated by reference.

BACKGROUND OF THE INVENTION

1. Field of the Invention

The present invention relates to a variable demultiplexer, and particularly to a variable demultiplexer using optical Bloch oscillations.

2. Description of the Background Art

In recent years, demands for large-capacity optical communication networks have been remarkably increasing. As one of techniques for meeting such demands, there has been wavelength division multiplex transmission. For using this technique, changes have occurred in main devices, and it is now required to use optical control devices such as a variable demultiplexer. Variable demultiplexers using optical Bloch oscillations or photonic crystals have been known as the above kind of variable demultiplexers.

The variable demultiplexer using the optical Bloch oscillations is disclosed, e.g., in "OPTICS LETTERS", (U.S.A.), Optical Society of America, Nov. 1, 1998, Vol. 23, No. 21, pp. 1701-1703 and "PHYSICAL REVIEW LETTERS" (U.S.A.), The American Physical Society, Dec. 6, 1999, Vol. 83, No. 23, pp. 4756-4759. FIG. 24 is a schematic perspective view of the variable demultiplexer disclosed in "OPTICS LETTERS", (U.S.A.), Optical Society of America, Nov. 1, 1998, Vol. 23, No. 21, pp. 1701-1703. FIG. 25 is a graph illustrating a relationship between a position in an X-axis direction and a refractive index gradient in the variable demultiplexer shown in FIG. 24. FIG. 26 is a schematic plan of the variable demultiplexer disclosed in the above "PHYSICAL REVIEW LETTERS". Referring to FIGS. 24-26, these conventional variable demultiplexers will now be described.

As shown in FIG. 24, the variable demultiplexer disclosed in the above "OPTICS LETTERS" has a waveguide array formed of waveguides 122 which are cyclically arranged on a substrate 121 with spaces therebetween. The upper side of the waveguide array is covered with an electrode 123. A terminal 126b is connected to electrode 123. A terminal 126a is connected to substrate 121. The spaces between waveguides 122 are constant. Each waveguide 122 has the same structure in the Z-axis direction as the others.

A voltage $V_0$ is applied across terminals 126a and 126b, and a current I flows through electrode 123 to cause variations in voltage in the X-axis direction. Thereby, in addition to the cyclic changes in refractive index caused by the cyclic waveguide array, a linear refractive index gradient $\Delta n$ is caused by these voltage changes as illustrated in FIG. 25. When light is emitted through one end of the waveguide, propagation of the light moves toward a high refractive index side. These oscillations in the X-axis direction are referred to as "optical Bloch oscillations".

When voltage $V_0$ changes, refractive index gradient $\Delta n$ changes so that the amplitude of the optical Bloch oscillations changes. Thereby, switching of the output waveguide can be performed; Thus, applied voltage $V_0$ can control a position of an output port.

In the variable demultiplexer disclosed in the foregoing "PHYSICAL REVIEW LETTERS", as shown in FIG. 26, a waveguide array is formed by waveguides 132 arranged parallel to each other on a substrate 131. In the waveguide array, widths of waveguides 132 gradually increase as the position moves in the forward direction along the X-axis. Also, spaces between neighboring waveguides 132 decrease as the position moves in the forward direction along the X-axis. Each waveguide 132 has a uniform structure in the Z-axis direction.

In the variable demultiplexer shown in FIG. 26, changes in space between waveguides 132 and changes in width of waveguides 132 of the waveguide array cause the cyclic changes in refractive index as well as the refractive index gradient caused by the changes in effective refractive index. Consequently, when light is emitted into waveguide 132 through its one end, optical Bloch oscillations occur. When the power of the incident light increases, a nonlinear effect occurs, and the incident light does not follow the linear refractive index gradient. Consequently, the amplitude of the optical Bloch oscillations changes so that switching of an output waveguide can be performed. Thus, the output port can be controlled by changing the power of the incident light.

Such a device is also known that a photonic crystal is used as a principle of the demultiplexer, instead of the foregoing optical Bloch oscillations. The photonic crystal is an artificial structure in which two or more kinds of materials having different refractive indexes are arranged with a periodicity nearly equal to a wavelength of light. In the photonic crystal, a band structure with respect to an energy of photons is formed similarly to a phenomenon in which a periodic potential distribution in a solid crystal forms a band structure with respect to an energy of electrons. The photonic crystal has three features, i.e., PBG (Photonic Band Gap), anisotropy and dispersibility which are important for application.

Variable demultiplexers using the photonic crystals are disclosed, e.g., in Japanese Patent Laying-Open Nos. 2003-255160 and 2003-43277. Japanese Patent Laying-Open No. 2003-255160 has disclosed an optical wavelength multiplexer/demultiplexer employing a combination of AWG (Arrayed Waveguide Grating) and the photonic crystal. More specifically, according to Japanese Patent Laying-Open No. 2003-255160, a photonic crystal wavelength select filter of a grid modulation type is inserted into a groove extending perpendicularly to a slab waveguide on the output side of the AWG so that cost reduction can be achieved, crosstalk can be reduced and losses in output light provided from respective channels can be uniform. In this Japanese Patent Laying-Open No. 2003-255160, the AWG is utilized for the demultiplexing function, and a filter formed of the photonic crystal is added for achieving the cost reduction and low crosstalk.

Japanese Patent Laying-Open No. 2003-43277 has disclosed a wavelength demultiplexer circuit using a super-prism phenomenon. The super-prism phenomenon is caused by dispersibility of the photonic crystal, and a slight difference in wavelength within the photonic crystal causes large changes in propagation angle according to this phenomenon. The technique disclosed in this Japanese Patent Laying-Open No. 2003-43277 has a feature that the propagation angle in the crystal is significantly changed by the use of this super-prism phenomenon, and thereby the transmission path is demarcated according to the wavelength. Consequently, in this Japanese Patent Laying-Open No. 2003-43277, it is not necessary to form individual waveguides in contrast to the AWG, and fast operations, high packing densities, improved transmission efficiency and others can be achieved.

However, the prior arts already described suffer from the following problems.

In connection with the techniques disclosed in "OPTICS LETTERS" and "PHYSICAL REVIEW LETTERS", the light propagates a long distance (which will be referred to as a "one-period propagation distance" hereinafter) of 10 mm or more in the Z-axis direction while a oscillation for one period occurs in the light traveling which oscillates in the X-axis direction due to the optical Bloch oscillations. Therefore, when producing the variable demultiplexers, problems of low yield and bad productivity are liable to occur. In particular, when producing the variable demultiplexers by Electron Beam (EB) exposure, it is impossible to produce each of chips in one field of the EB exposure step, and a field boundary is formed inside a structure of the variable demultiplexer. This may cause unstable features in the variable demultiplexer.

The techniques disclosed in Japanese Patent Laying-Open Nos. 2003-255160 and 2003-43277 do not have a function of switching an optical path in an optical transmission path, and these references have neither disclosed nor suggested a variable mechanism. In connection with the technique disclosed in Japanese Patent Laying-Open No. 2003-255160, when an AWG is once formed on a substrate, it is no longer possible to change the form of the slab waveguide on the output side and the structure of the array waveguides. Thus, the output wavelength in each output waveguide is fixed, and usually cannot be changed. Likewise, according to the technique disclosed in Japanese Patent Laying-Open No. 2003-43277, when the photonic crystal is once produced, it is no longer possible to change the structure such as a form and a size of a hole and a grating constant of the photonic crystal. Thus, each wavelength is output at a fixed position, and flexible switching is impossible.

SUMMARY OF THE INVENTION

An object of the invention is to provide a small variable demultiplexer which includes a variable mechanism, and can reduce sizes of an element so that improved yield and stable characteristics can be achieved.

A variable demultiplexer according to the invention includes a base medium, a waveguide array and an external refractive index modulation unit. The waveguide array is formed of a plurality of waveguides arranged in parallel to each other in a discrete fashion. The external refractive index modulation unit forms in the waveguide array a refractive index gradient variable between the plurality of waveguides in a direction perpendicular to an extension direction of the waveguide. The waveguide has a one-dimensional photonic crystal structure in the extension direction of the waveguide.

As described above, the invention lowers a group velocity in a traveling direction of light caused by the one-dimensional photonic crystal structure formed in the waveguide array so that elements of small sizes can be produced. Consequently, each chip can be produced by EB exposure within one field so that the characteristics are stable, and the yield is improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. In the following description and drawings, the same or corresponding portions bear the same reference numbers, and description thereof is not repeated.

First Embodiment

Figure 1:
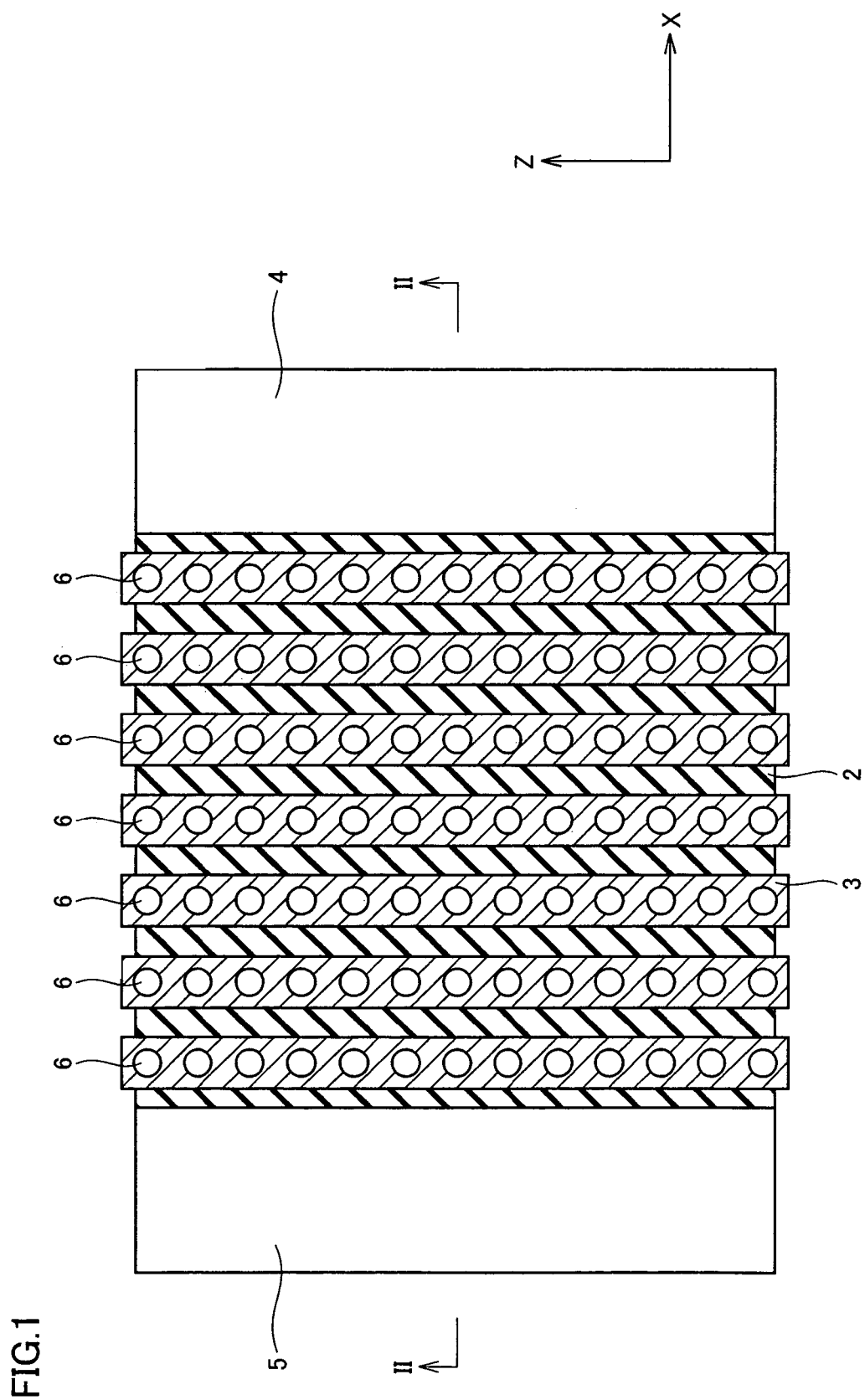
FIG. 1 is a schematic plan of a first embodiment of a small variable demultiplexer according to the invention.
Figure 2:
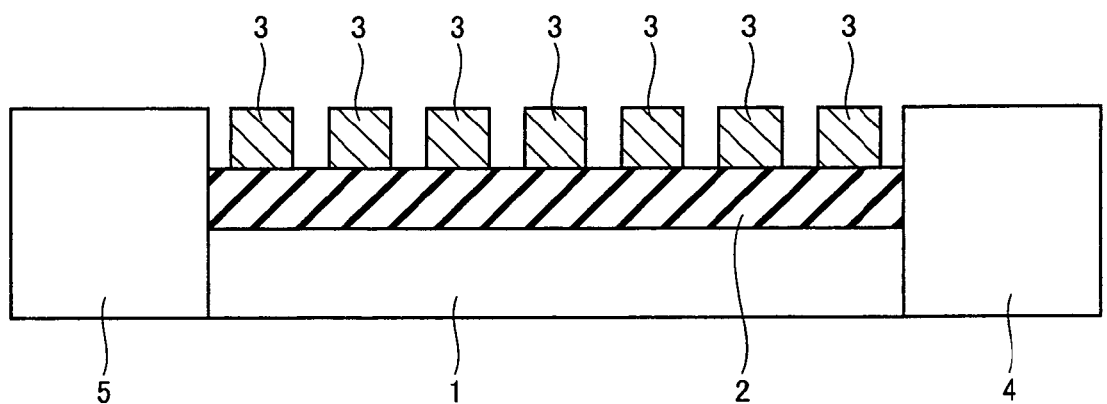
FIG. 2 is a schematic cross section taken along line II-II in FIG. 1.

Referring to FIGS. 1 and 2, a first embodiment of a small variable demultiplexer according to the invention will now be described.

A small variable demultiplexer shown in FIGS. 1 and 2 is formed of a Si photonic wire waveguide array using an SOI (Silicon On Insulator). As shown in FIG. 2, an $SiO_2$ layer 2 is arranged over a silicon substrate 1. A plurality of Si photonic wire waveguides 3 formed of an upper silicon layer 13 (see FIG. 3) are formed on $SiO_2$ layer 2. The plurality of Si photonic wire waveguides 3 are parallel to each other, and extend in a Z-axis direction as can be seen from FIG. 1. The plurality of Si photonic wire waveguides 3 are spaced by a predetermined distance in an X-axis direction from each other, and are arranged in a discrete (cyclic) fashion. Thus, the plurality of Si photonic wire waveguides 3 are formed parallel to each other with substantially uniform spaces therebetween. A heater 4 and a heat sink 5 are connected to end surfaces, which are located at the opposite ends in the X-axis direction, respectively, of each of silicon substrate 1 and $SiO_2$ layer 2. Heater 4 is arranged on the end surfaces located at the forward end in the positive X-axis direction of silicon substrate 1 and $SiO_2$ layer 2. Heat sink 5 is arranged on the end surfaces remote from heater 4 (i.e., the end surfaces at the rear end in the forward X-axis direction) of silicon substrate 1 and $SiO_2$ layer 2. Heater 4 may be made of any member such as a heating wire (resistance heating wire) or a Peltier element that can generate a heat. Heat sink 5 may be made of any member that can remove a heat from the waveguide array, and may be made of, e.g., a Peltier element or a radiator (e.g., copper block) made of a material having a high thermal conductivity, and thus.

As shown in FIG. 1, a plurality of empty holes 6 are formed at an upper surface of each Si photonic wire waveguide 3, and are cyclically arranged in a direction of extension of Si photonic wire waveguide 3. Empty holes 6 thus arranged in the cyclic fashion form a one-dimensional photonic crystal structure. In FIG. 1, the traveling direction of the light is defined as the Z-axis direction, and a direction perpendicular to the extension direction of Si photonic wire waveguide 3 is defined as the X-axis direction. In this example, the X-axis direction is a oscillation direction of optical Bloch oscillations.

Referring to FIGS. 3 to 6, description will now be given on a method of producing the waveguide array formed of the Si photonic wire waveguides.

Figure 3:
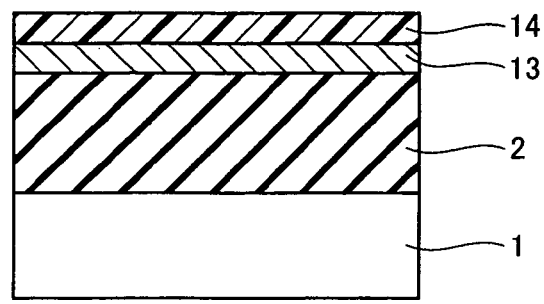
FIGS. 3 to 6 are cross sections for illustrating first to fourth steps in a manufacturing method of the first embodiment of the small variable demultiplexer shown in FIGS. 1 and 2, respectively.

As shown in FIG. 3, $SiO_2$ layer 2 is formed on silicon substrate 1. $SiO_2$ layer 2 has a thickness of 3 μm and a refractive index of 1.4. Upper silicon layer 13 is formed on $SiO_2$ layer 2. Upper silicon layer 13 has a thickness of 0.25 μm and a refractive index of 3.5. Silicon substrate 1, $SiO_2$ layer 2 and upper silicon layer 13 form an SOI substrate. A resist film 14 is formed over upper silicon layer 13. In this manner, the structure shown in FIG. 3 is formed.

$SiO_2$ layer 2 has a large thickness of 3 μm for the purpose of suppressing a mode leak to silicon substrate 1 when the light is emitted into upper silicon layer 13. The required thickness of $SiO_2$ layer 2 is only 1 μm or more, and a thickness of 3 μm or more is more preferable. In the following description, the SOI substrate is used, and the waveguide array is formed by arranging Si photonic wire waveguides 3 (see FIG. 2) formed of upper silicon layer 13 on $SiO_2$ layer 2. However, any material may be used provided that a clad layer and a waveguide layer made of a material having a larger refractive index than the clad layer can confine the light, and the waveguide layer can form the one-dimensional photonic crystal structure.

Figure 4:
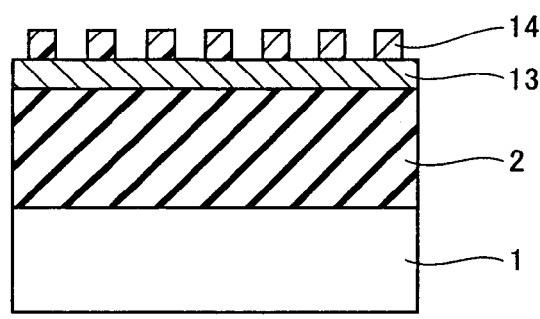
Figure 5:
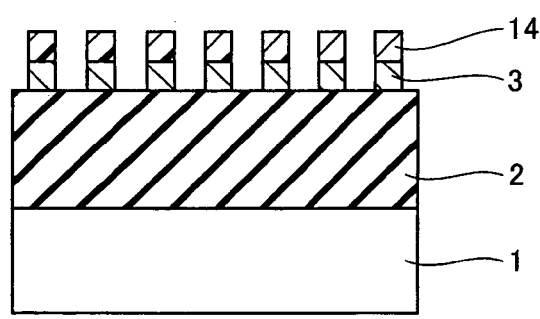

As shown in FIG. 4, the EB exposure is effected on resist film 14 to form a resist pattern for forming the cyclic waveguide array and the cyclic one-dimensional photonic crystal structure (empty holes 6 in FIG. 1). The resist pattern formed of resist film 14 is provided with openings for forming empty holes 6 although not shown. As shown in FIG. 5, resist film 14 forming the foregoing resist pattern is used as a mask, and upper silicon layer 13 is partially removed by etching so that Si photonic wire waveguides 3 formed of upper silicon layer 13 (see FIG. 4) are formed. Si photonic wire waveguides 3 thus formed extend perpendicularly to a sheet of FIG. 5, and are parallel to each other. In the above processing, the plurality of empty holes 6 are formed at the upper surfaces of Si photonic wire waveguides 3.

Figure 6:
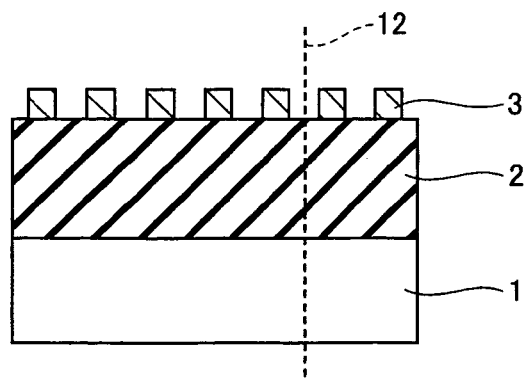

Then, remaining resist film 14 is removed by a peeling liquid as shown in FIG. 6. Finally, heater 4 and heat sink 5 are arranged on the opposite ends of the waveguide array as shown in FIGS. 1 and 2. In this manner, the small variable demultiplexer shown in FIGS. 1 and 2 can be produced. Each Si photonic wire waveguide 3 has a width of 0.5 μm in the X-axis direction (see FIG. 1), a height of 0.25 μm and a length of 500 μm in the Z-axis direction. The waveguide array is formed in the cyclic fashion such that each distance between the neighboring Si photonic wire waveguides is constant, and is equal to 0.5 μm. Empty hole 6 has a diameter of 0.3 μm, and empty holes 6 are arranged with a pitch of 0.5 μm. The pitch is a distance between centers of neighboring empty holes 6.

Figure 7:
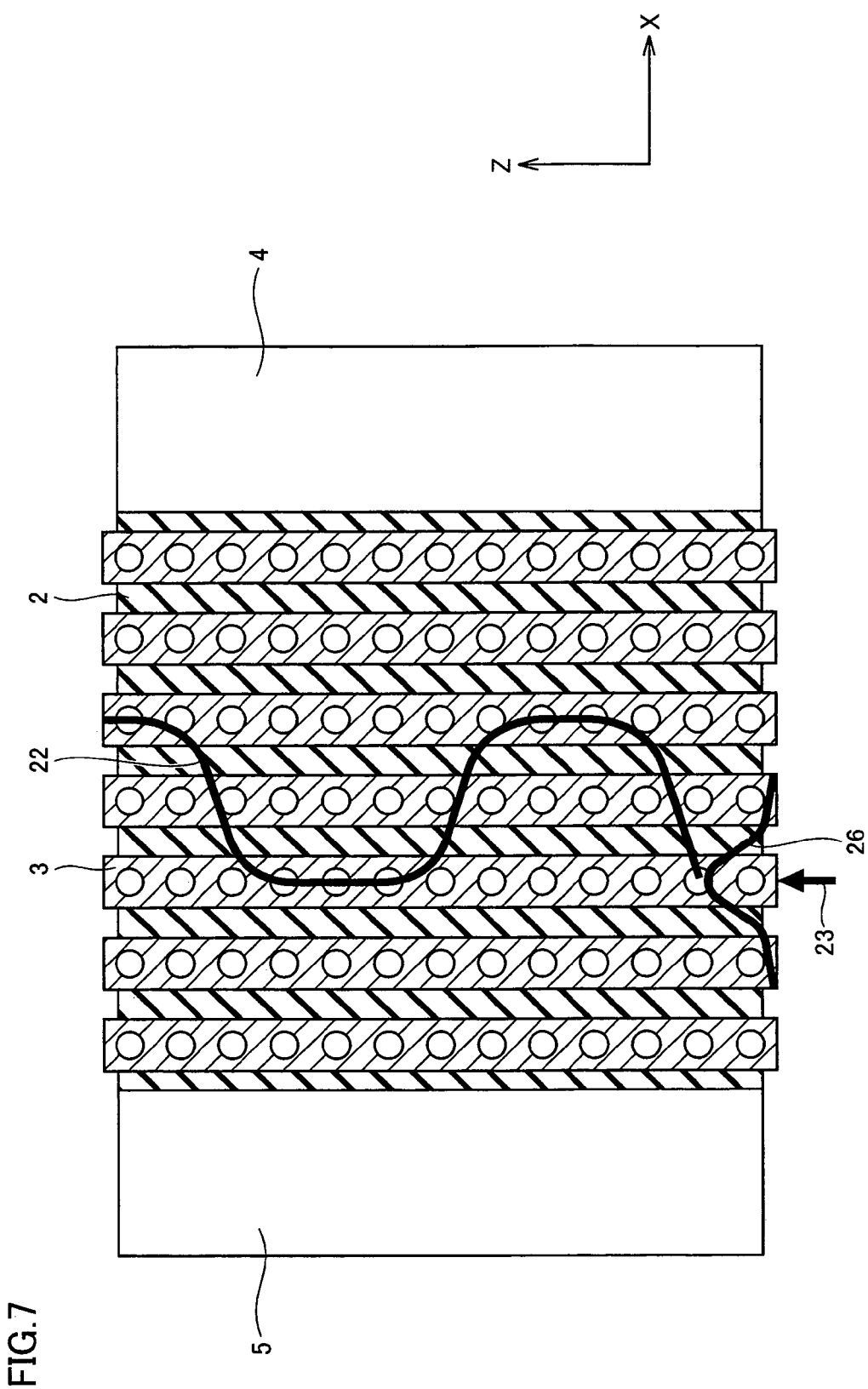
FIG. 7 is a schematic view for illustrating propagation of light in a waveguide array of the small variable demultiplexer shown in FIGS. 1 and 2.
Figure 8:
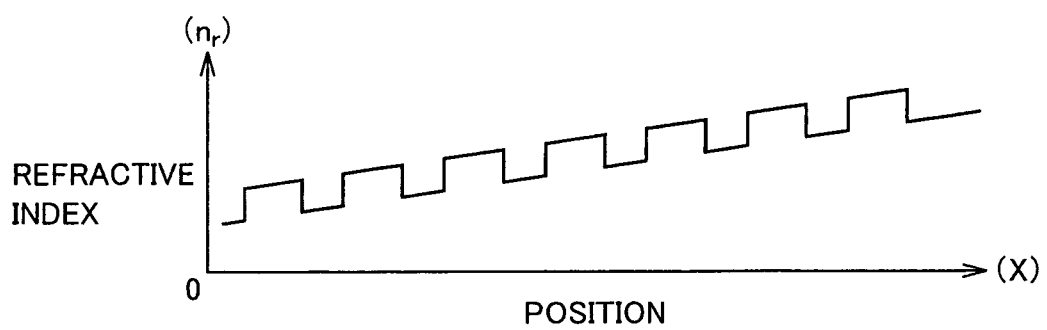
FIG. 8 is a graph illustrating a distribution of refractive indexes of respective Si photonic wire waveguides in the waveguide array of the small variable demultiplexer shown in FIG. 7.

Referring to FIGS. 7 and 8, description will now be given on the propagation of the light through the waveguide array in the small variable demultiplexer shown in FIG. 1.

As shown in FIG. 7, it is now assumed that the light enters through an end of one Si photonic wire waveguide 3 as indicated by an arrow 23. The light diverges from one Si photonic wire waveguide 3 as indicated by a light intensity distribution 26 in FIG. 7. As can be seen from FIG. 8, the cyclic waveguide array causes cyclic changes in refractive index, and the temperature gradients caused in the X-axis direction by heater 4 and heat sink 5 provide the gradient of the refractive index.

When the light diverging from one Si photonic wire waveguide 3 enters one Si photonic wire waveguide 3 through its one end as indicated by arrow 23, the cyclic changes in refractive index and the refractive index gradient in the waveguide array cause optical Bloch oscillations as indicated by a curve 22 in FIG. 7. Therefore, the incident light repeats the cyclic vibrating operation. The light exits from an arbitrary output port on the end surface which is located at an end in the Z-axis direction (i.e., traveling direction of the light) of the waveguide array. In this operation, oscillations of the light in the X-axis direction is caused by such a phenomenon that an end of the light diverging from one Si photonic wire waveguide 3 as indicated by curve 26 spreads or leaks into neighboring Si photonic wire waveguides 3.

Description will now be given on a function of the small variable demultiplexer shown in FIGS. 1 and 2, and particularly on the function as the variable demultiplexer. As shown in FIG. 7, when the light diverging from one Si photonic wire waveguide 3 enters, the temperatures of heater 4 and heat sink 5 are controlled to change the temperature gradient in the waveguide array. Consequently, the refractive index gradient in FIG. 8 can be changed. This results in changes in extent or degree to which the incident light leaks into neighboring Si photonic wire waveguides 3. Therefore, the amplitude of the optical Bloch oscillations changes so that the light can exit from an output port different from the foregoing output port. Thus, the small variable demultiplexer according to the invention can switch the output port by the modulation in refractive index gradient.

Figure 9:
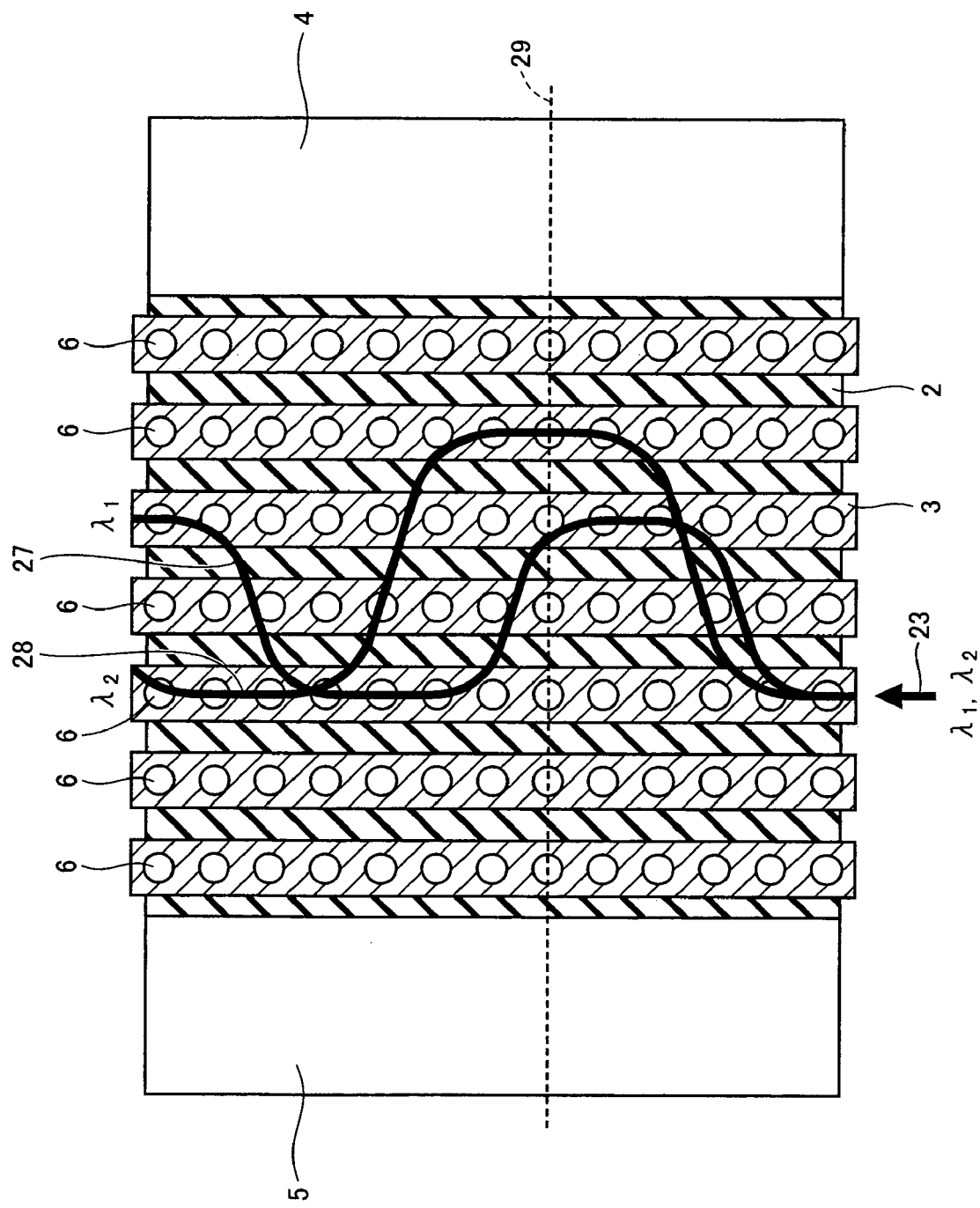
FIG. 9 illustrates a function as a demultiplexer of the small variable demultiplexer according to the invention.

Referring to FIG. 9, description will now be given on the function as the demultiplexer of the small variable demultiplexer according to the invention. The following description will be given on a demultiplexing method in the case where light beams of wavelengths $\lambda 1$ and $\lambda 2$ ($\lambda 1 < \lambda 2$) enter the small variable demultiplexer. However, the small variable demultiplexer according to the invention can perform similar demultiplexing of the light beams having three or more wavelengths.

As indicated by arrow 23 in FIG. 9, it is now assumed that two kinds of light of wavelengths $\lambda 1$ and $\lambda 2$ ($\lambda 1 < \lambda 2$) each diverging from one Si photonic wire waveguide 3 enter. In this case, the light of each wavelength propagates through a path indicated by curve 27 or 28 in FIG. 9 as a result of the optical Bloch oscillations. The extent or degree of leaking of the light into neighboring Si photonic wire waveguides 3 depends on wavelength $\lambda 1$ or $\lambda 2$. Therefore, the light of longer wavelength $\lambda 2$ leaks to a larger extent than the light of wavelength $\lambda 1$, and consequently has a larger amplitude of oscillations. Thus, the light of wavelength $\lambda 1$ travels through a path different from that of the light of wavelength $\lambda 2$ as indicated by curves 27 and 28. By arranging output ports at a portion indicated by dotted line 29 in FIG. 9, demultiplexing of the above kinds of light of wavelengths $\lambda 1$ and $\lambda 2$ can be easily performed.

Figure 10:
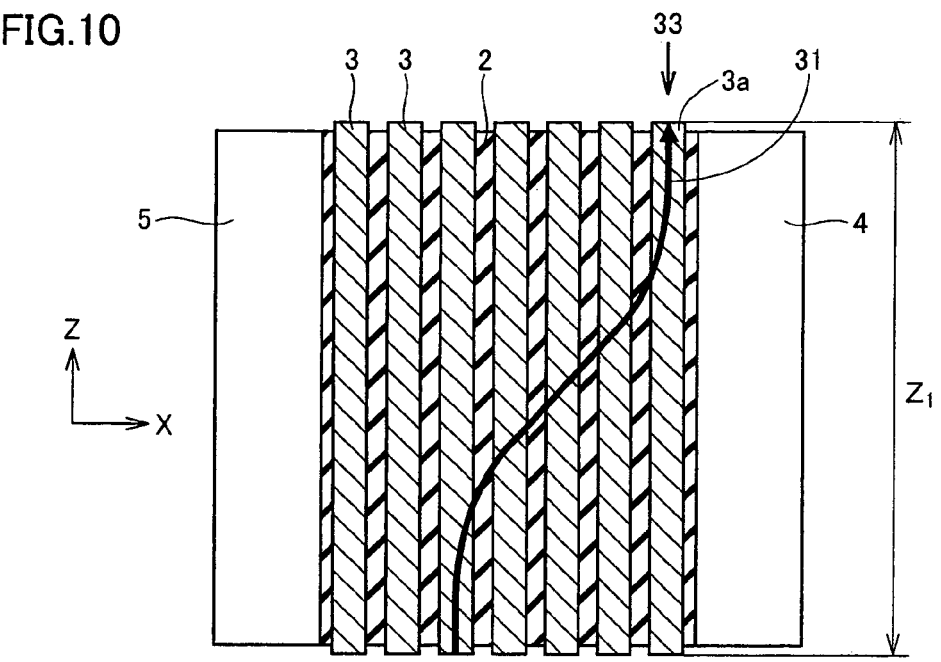
FIG. 10 is a schematic plan showing a variable demultiplexer formed of a waveguide array not having the one-dimensional photonic crystal structure in the Si photonic wire waveguide.
Figure 11:
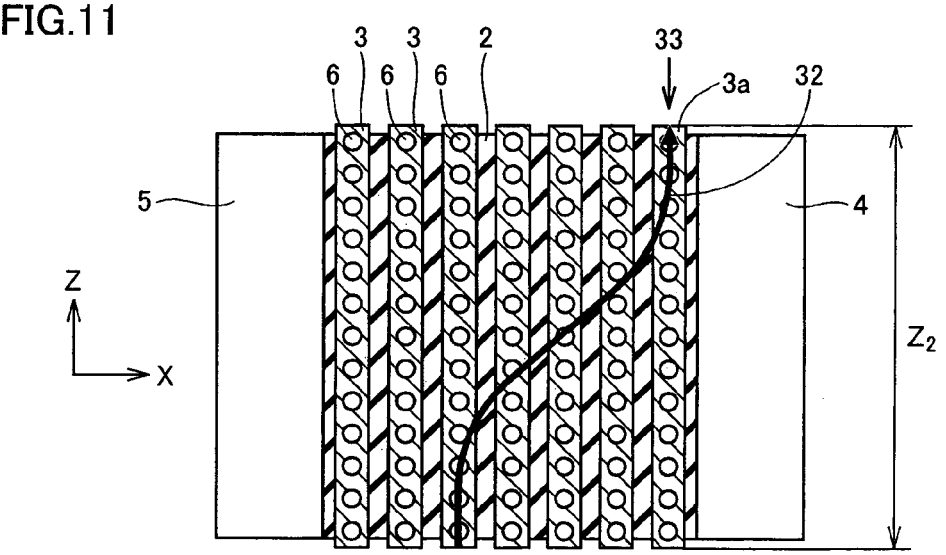
FIG. 11 is a schematic plan showing a variable demultiplexer formed of a waveguide array having the one-dimensional photonic crystal structure in the Si photonic wire waveguide.

Referring to FIGS. 10 and 11, description will now be given on an group velocity lowering effect caused by the one-dimensional photonic crystal structure. In the following description, a comparison is made between the wavelength required when the one-dimensional photonic crystal structure is formed in Si photonic wire waveguide 3 providing the waveguide array and the waveguide length required when such one-dimensional photonic crystal structure is not formed.

Si photonic wire waveguide 3 shown in FIG. 10 is a medium which is uniform in the Z-axis direction. Therefore, the group velocity of the light in Si photonic wire waveguide 3 is obtained by dividing the light velocity c by a refractive index $n_r$, and the group velocity does not lower. In this case, when the light is to be output from an end surface 33 of one Si photonic wire waveguide 3a, a propagation length $Z_1$ equal to 10 mm is required as shown in FIG. 10.

In the variable demultiplexer shown in FIG. 11, Si photonic wire waveguide 3 has a photonic crystal structure formed in the Z-axis direction so that the group velocity of the light in Si photonic wire waveguide 3 takes a value according to a dispersion relationship caused by the cyclic structure. When incident light has a frequency (e.g., of $1.26 \times 10^{15}$ Hz) exhibiting the dispersion relationship of a small gradient, the group velocity can be lowered. Therefore, even when the light is to be output from end surface 33 of one Si photonic wire waveguide 3a similarly to the case shown in FIG. 10, a required propagation length $Z_2$ can be relatively short ($Z_2 < Z_1$). In the structure of this embodiment, the length $Z_2$ can be equal to 400 μm. Thus, the propagation length can be ⅟25 of propagation length $Z_1$ in the variable demultiplexer shown in FIG. 10.

In the variable demultiplexer of the inventions shown in FIG. 1, the one-dimensional photonic crystal structure is formed in Si photonic wire waveguide 3 so that the group velocity may be lowered. Consequently, the light can be output while further reducing the light propagation length in the Z-axis direction. Therefore, the element size of the variable demultiplexer can be reduced. Consequently, the small variable demultiplexer can be achieved.

One field of the EB exposure has a size of 500 μm square, but the small variable demultiplexer according to the invention can be produced with smaller sizes. Therefore, the element (variable demultiplexer) can be produced so that it can be located within one field of the EB exposure. Consequently, the variable demultiplexer can be produced without arranging a joint between fields inside one variable demultiplexer. Thereby, the variable demultiplexer can have stable characteristics, and the yield thereof is improved.

Figure 12:
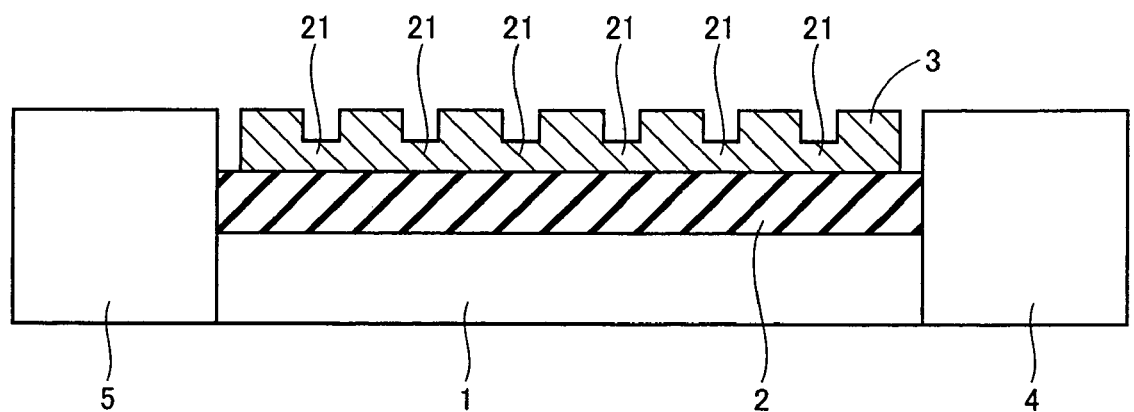
FIG. 12 is a schematic cross section showing a first modification of the first embodiment of the small variable demultiplexer according to the invention shown in FIG. 1.

As can be seen from FIG. 6, when etching is effected for forming Si photonic wire waveguides 3 in the variable demultiplexer shown in FIG. 1, upper silicon layer 13 formed on $SiO_2$ layer 2 is partially removed until the top surface of $SiO_2$ layer 2 is exposed. Consequently, Si photonic wire waveguides 3 on $SiO_2$ layer 2 are spaced from each other by a predetermined distance. As shown in FIG. 12, however, the etching for forming Si photonic wire waveguides 3 may be stopped before the top surface of $SiO_2$ layer 2 is exposed so that the silicon layer may partially remain.

Referring to FIG. 12, description will now be given on a first modification of the first embodiment of the small variable demultiplexer according to the invention. FIG. 12 corresponds to FIG. 2.

A small variable demultiplexer shown in FIG. 12 has basically the same structure as the variable demultiplexer shown in FIGS. 1 and 2. However, the etching is stopped before the top surface of $SiO_2$ layer 2 is exposed so that a remaining portion 21 of upper silicon layer 13 is formed. A height from the top surface of $SiO_2$ layer 2 to the top surface of remaining portion 21 is shorter than the height from the top surface of $SiO_2$ layer 2 to the top surface of Si photonic wire waveguide 3. A difference, e.g., of 0.1 μm may be present between the height from the top surface of $SiO_2$ layer 2 to the top surface of Si photonic wire waveguide 3 and the height from the top surface of $SiO_2$ layer 2 to the top surface of remaining portion 21.

Figure 13:
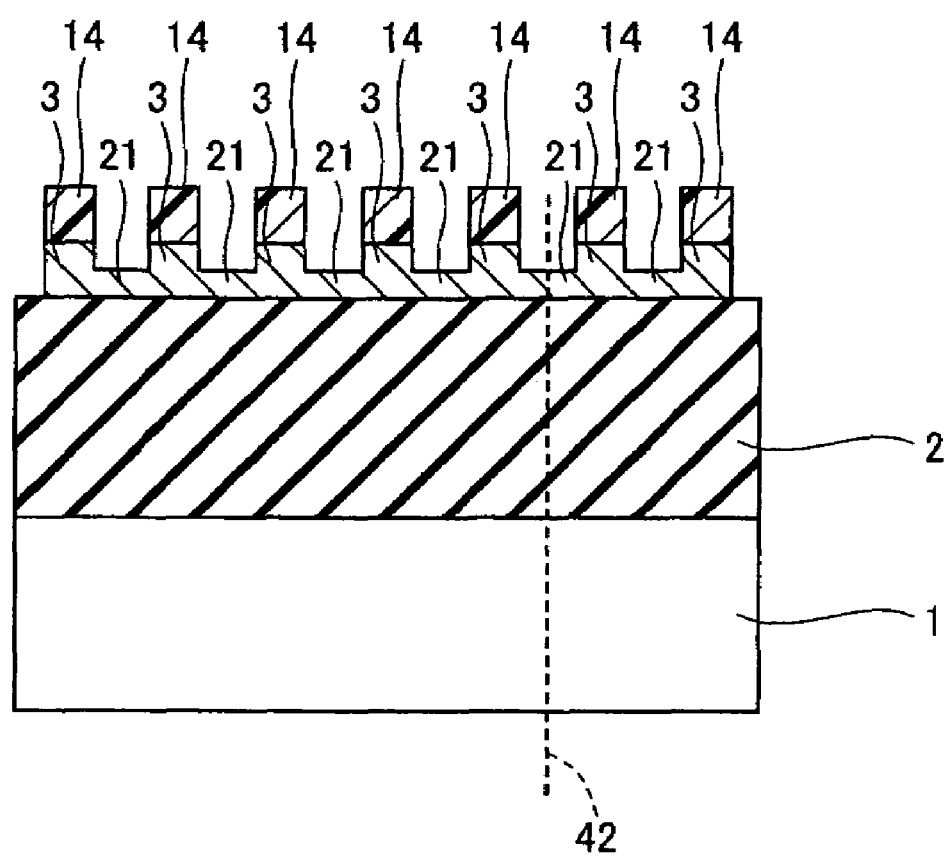
FIG. 13 is a schematic cross section for illustrating a method of producing the small variable demultiplexer shown in FIG. 12.

Referring to FIG. 13, a method of producing the small variable demultiplexer shown in FIG. 12 will now be described. FIG. 13 corresponds to FIG. 6.

After the steps in FIGS. 3 and 4, upper silicon layer 13 masked with resist film 14 (see FIG. 4) is partially removed by the etching. In this processing, the etching is effected to remove a portion of uppersilicon layer 13 by a thickness of 0.1 μm from the top surface. Thereby, as shown in FIG. 13, remaining portion 21 of upper silicon layer 13 can be formed between each and neighboring Si photonic wire waveguides 3. Thereafter, removal and other processing similar to that in the method of manufacturing the small variable demultiplexer already described with reference to FIG. 6 are executed so that the variable demultiplexer shown in FIG. 12 is formed.

As described above, remaining portions 21 of upper silicon layer 13 are arranged between each and neighboring Si photonic wire waveguides 3 so that the effective refractive index on a cross section indicated by dotted line 42 in FIG.

13 (i.e., on a section crossing remaining portion 21 and extending in the extension direction of Si photonic wire waveguide 3) can be larger than that on the cross section indicated by dotted line 12 in FIG. 6. This can reduce a refractive index difference Δn between Si photonic wire waveguide 3 and a region, which includes remaining portion 21 and an air layer formed by etching upper silicon layer 13 (and will be referred to as a "gap" hereinafter). Further, by changing the thickness of remaining portion 21, it is possible to change freely the effective refractive index at the section indicated by dotted line 42 so that the value of refractive index difference Δn can be freely changed. Thereby, it is possible to adjust significantly the extent to which the light leaks into neighboring Si photonic wire waveguide 3.

In the variable demultiplexer shown in FIG. 12, remaining portion 21 is made of the same material as Si photonic wire waveguide 3. However, remaining portion 21 may be formed of a material different from that of Si photonic wire waveguide 3. For this, such a production method may be employed that a material forming remaining portions 21 is applied to fill spaces between neighboring Si photonic wire waveguides 3 after forming Si photonic wire waveguides 3 as shown in FIG. 1.

Figure 14:
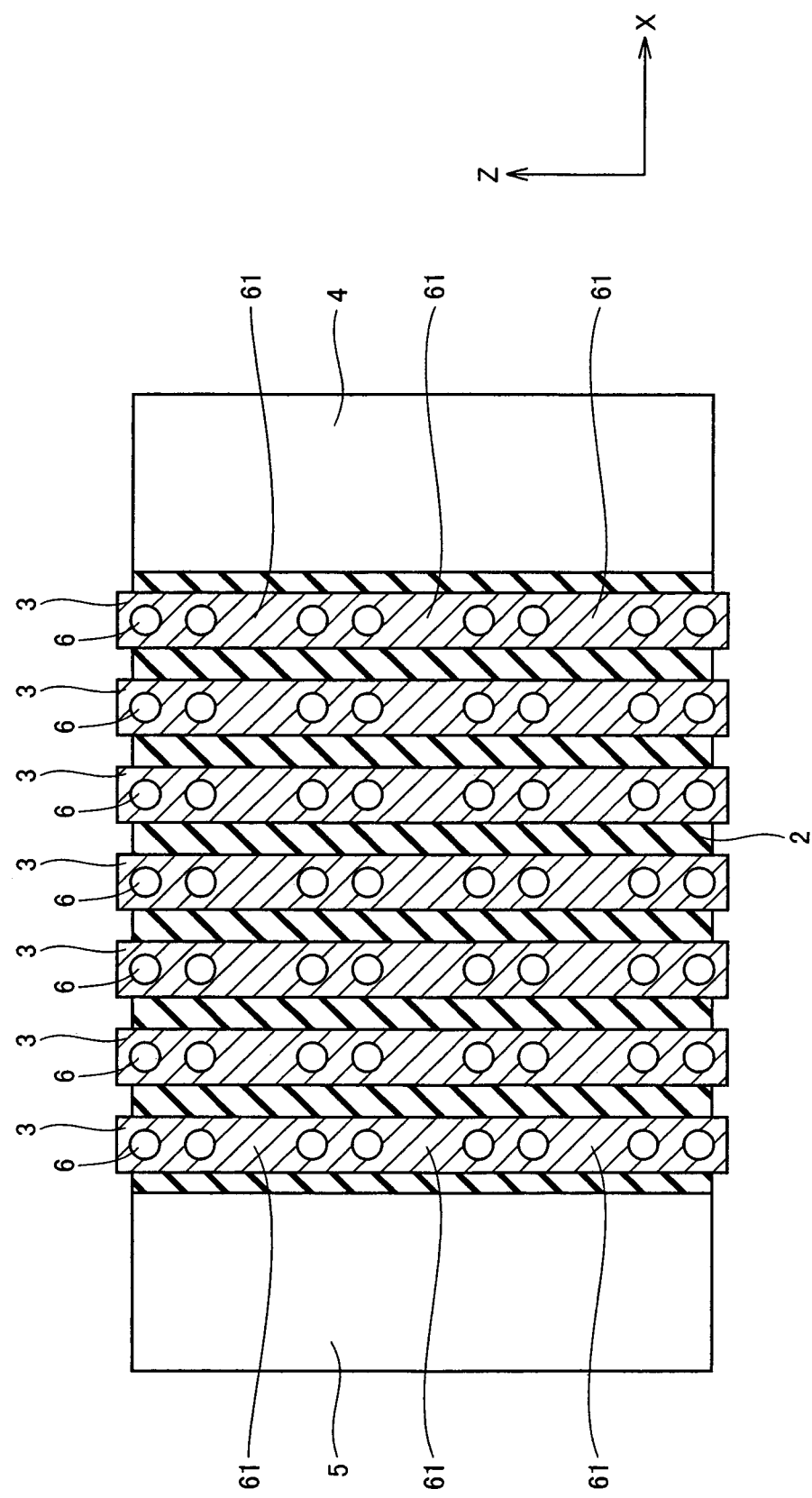
FIG. 14 is a schematic plan showing a second modification of the first embodiment of the small variable demultiplexer according to the invention shown in FIG. 1.

Referring to FIG. 14, description will now be given on a second modification of the first embodiment of the small variable demultiplexer according to the invention. FIG. 14 corresponds to FIG. 1.

The small variable demultiplexer shown in FIG. 14 has substantially the same structure as the variable demultiplexer shown in FIG. 1 except for that the plurality of empty holes 6 providing the one-dimensional photonic crystal structure are formed at Si photonic wire waveguides 3 in a different fashion. In the variable demultiplexer shown in FIG. 1, all the plurality of empty holes 6 providing the one-dimensional photonic crystal structure have the equal diameter, and empty holes 6 are spaced from each other by substantially uniform distances. Conversely, in the variable demultiplexer shown in FIG. 14, Si photonic wire waveguide 3 has a coupled-defect waveguide structure cyclically provided with donor type defects 61 which are formed by filling empty holes 6 with the medium (and thus are formed by not forming empty holes 6 at the portions to be used for empty holes 6). In this case, the group velocity of the light can be further lowered from that in the first embodiment shown in FIG. 1. Consequently, the sizes of the variable demultiplexer can be further reduced.

In the above description, donor type defects 61 are formed by not forming empty holes 6 as shown in FIG. 14 (and thus are formed by filling them with the same material as Si photonic wire waveguides 3). However, donor type defects 61 may be formed by once forming empty holes 6 in regions where donor type defects 61 are to be formed, and then filling empty holes 6 with another medium. The material for filling may be the same as or different form that of Si photonic wire waveguides 3.

Figure 15:
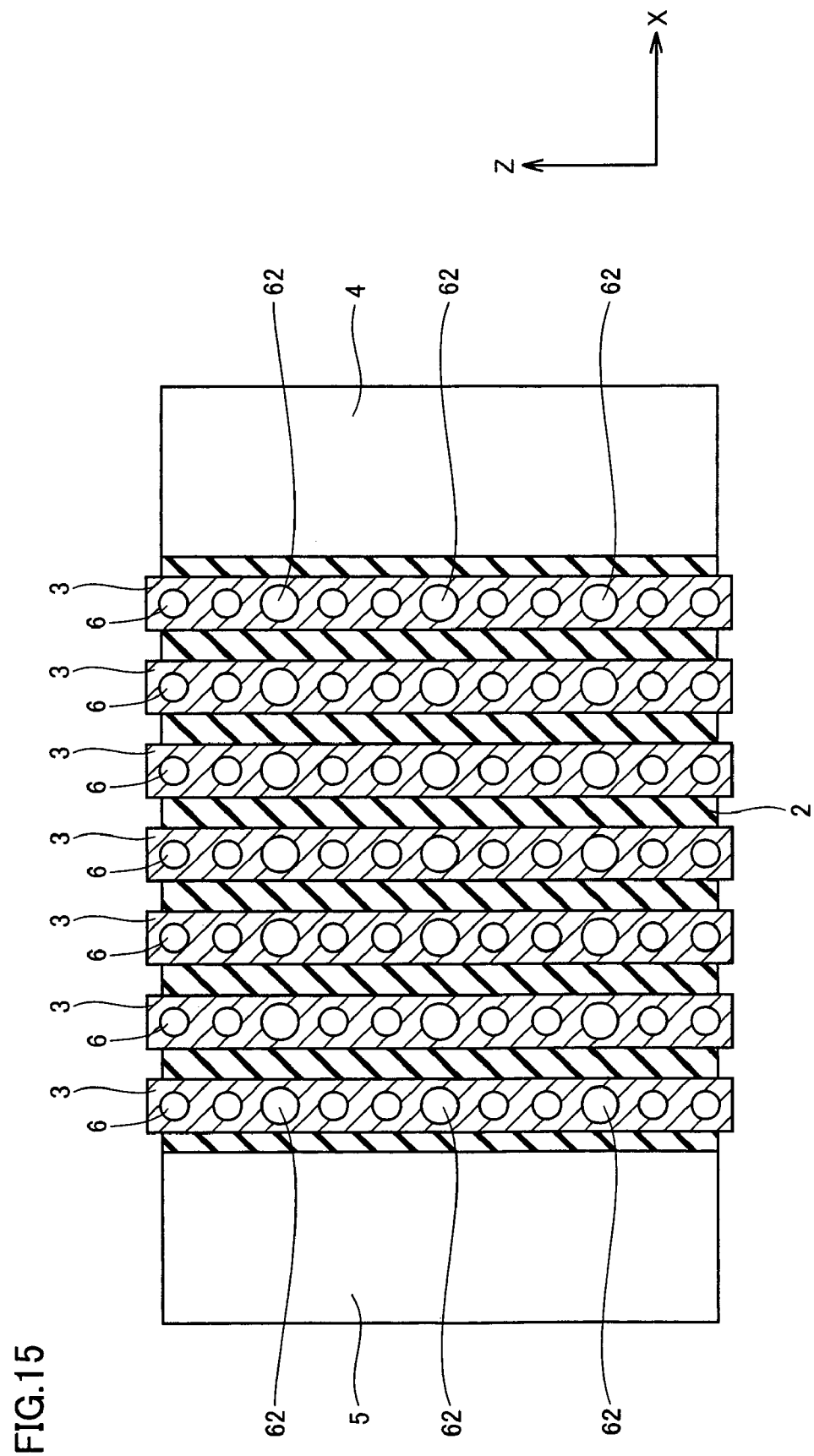
FIG. 15 is a schematic plan showing a third modification of the first embodiment the small variable demultiplexer of according to the invention shown in FIG. 1.

Referring to FIG. 15, description will now be given on a third modification of the first embodiment of the small variable demultiplexer according to the invention. FIG. 15 corresponds to FIG. 1.

The small variable demultiplexer shown in FIG. 15 has basically the same structure as the variable demultiplexer shown in FIG. 1 except for that empty holes 6 formed at Si photonic wire waveguide 3 and providing the one-dimensional photonic crystal structure have sizes that are not uniform. More specifically, in Si photonic wire waveguide 3 shown in FIG. 15, a row of empty holes 6 providing the one-dimensional photonic crystal structure includes empty holes (acceptor type defects 62) which are cyclically arranged and have larger diameters than the other empty holes 6. The empty hole forming acceptor type defect 62 may have a diameter, e.g., of 0.4 μm. This structure offers an effect of further lowering the group velocity of the light as compared with the first embodiment shown in FIG. 1. In FIG. 15, acceptor type defects 62 are cyclically arranged such that two empty holes 6 are located between neighboring two acceptor type defects 62. However, this manner of cyclic arrangement of acceptor type defects 62 can be freely changed. The empty hole forming acceptor type defect 62 may have a diameter of a value other than 0.4 μm, and its diameter may take any value different from that of empty hole 6. In the foregoing embodiment 1, the variable demultiplexer has Si photonic wire waveguides 3 of seven in number. However, Si photonic wire waveguides 3 other than seven in number can be freely employed.

Second Embodiment

Figure 16:
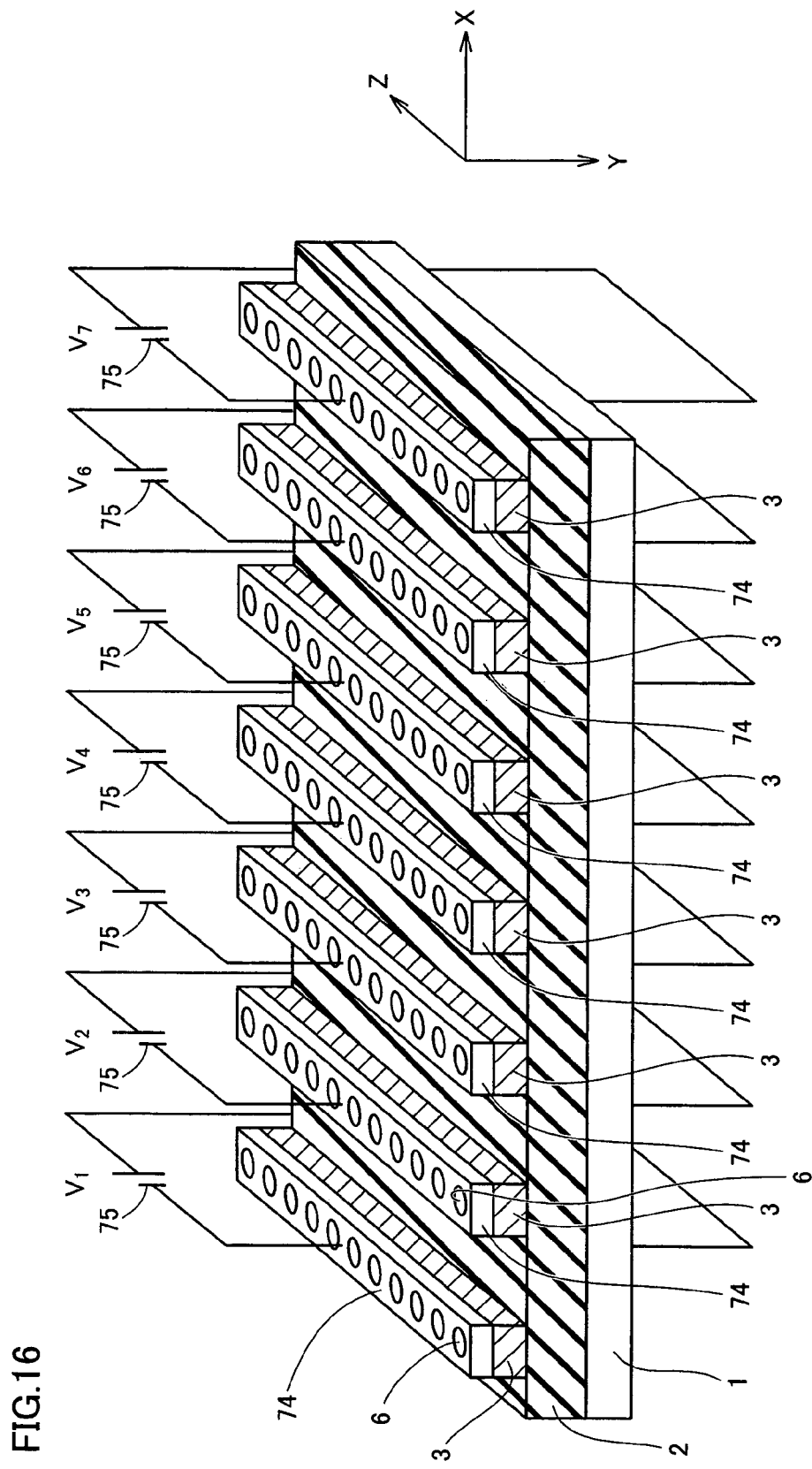
FIG. 16 is a schematic perspective view showing a second embodiment of the small variable demultiplexer according to the invention.
Figure 17:
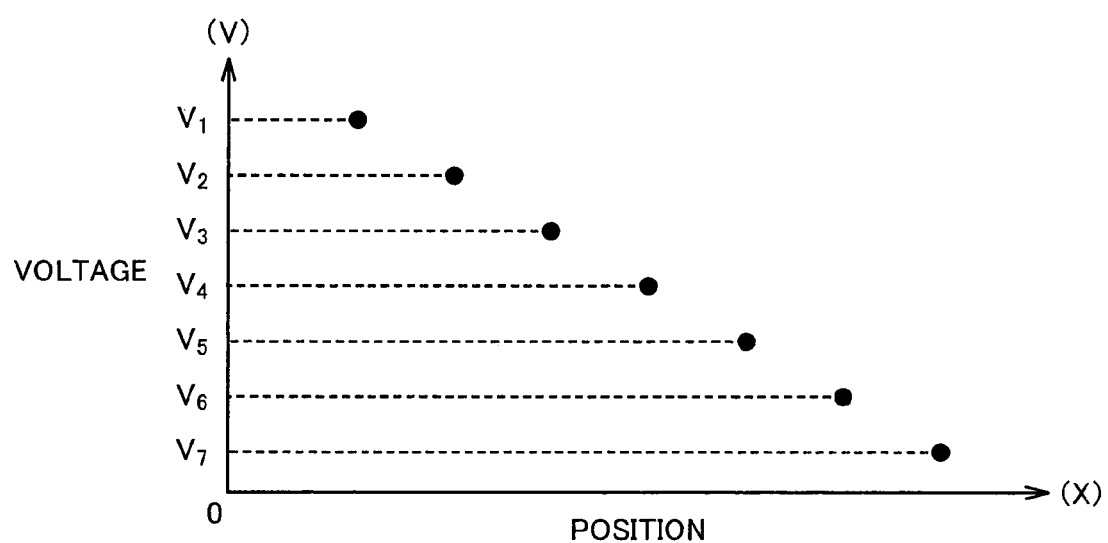
FIG. 17 is a graph illustrating a relationship between voltages applied to respective electrodes and a position in an X-axis direction of the electrode.

Referring to FIGS. 16 and 17, description will now be given on a second embodiment of the small variable demultiplexer according to the invention.

A small variable demultiplexer shown in FIG. 16 includes silicon substrate 1, $SiO_2$ layer 2 formed on silicon substrate 1, the plurality of Si photonic wire waveguides 3 formed on $SiO_2$ layer 2 and forming the waveguide array, and electrodes 74 formed on Si photonic wire waveguides 3. Si photonic wire waveguide 3 has substantially the same structure as Si photonic wire waveguide 3 in the small variable demultiplexer shown in FIG. 1. Each electrode 74 is provided with empty holes 6 reaching the lower surface of Si photonic wire waveguide 3. In FIG. 16, the traveling direction of the light is the Z-axis direction, a direction perpendicular to the extension direction of Si photonic wire waveguide 3 is the X-axis direction, and a direction of thickness of Si photonic wire waveguide 3 (i.e., direction perpendicular to the main surface of silicon substrate 1) is a Y-axis direction. The X-axis direction is a oscillation direction of the optical Bloch oscillations. The plurality of electrodes 74 are connected to power supplies 75 that can place different voltages on electrodes 74, respectively. Each power supply 75 is connected to electrode 74 and a rear side of silicon substrate 1 via conductive lines. In FIG. 16, $V_1$-$V_7$ are placed on electrodes 74 arranged on Si photonic wire waveguides 3, respectively.

Electrodes 74 in the small variable demultiplexer shown in FIG. 16 may be formed, e.g., in the following method. First, upper silicon layer 13 to be used for forming Si photonic wire waveguides 3 is formed on $SiO_2$ layer 2, and a conductive layer forming electrodes 74 is formed on upper silicon layer 13. Resist film 14 shown in FIG. 3 is formed on this conductive layer. Exposure and developing processing is effected on resist film 14 to form a predetermined pattern of resist film 14. Etching is effected on the conductive layer and upper silicon layer 13 masked with patterned resist film 14 to remove them partially. Thereafter, resist film 14 is removed. Thereby, Si photonic wire waveguides 3 and electrodes 74 are formed as shown in FIG. 16. The above etching also forms empty holes 6 at the same time.

In the small variable demultiplexer shown in FIG. 16, voltages $V_1$-$V_7$ of different values illustrated in FIG. 17 are placed on the electrodes, respectively, so that cyclic changes in refractive index and the gradient of refractive index are caused in the waveguide array. In FIG. 17, the ordinate gives the value of voltage placed on electrode 74, and the abscissa gives the position of electrode 74 (i.e., position of Si photonic wire waveguide 3).

Voltages $V_1$-$V_7$ are determined as $V_1$=4.8V, $V_2$=4.5V, $V_3$=4.2V, $V_4$=3.9V, $V_5$=3.6V, $V_6$=3.3V and $V_7$=3.0V, and are placed on electrodes 74, respectively. Thus, the value of voltage applied to electrode 74 gradually decreases (i.e., the voltage value linearly lowers) as the position of electrode 74 moves forward in the X-axis direction. This setting of the voltages can achieve the cyclic changes in refractive index and the gradient of refractive index in the waveguide array. For example, when voltages $V_1$-$V_7$ are set as described above, Si photonic wire waveguides 3 aligned in the ascending order of the refractive index can have the refractive indexes equal to 3.45, 3.46, 3.47, 3.48, 3.49, 3.50 and 3.51, respectively. Contents of the voltage setting may be other than those already described provided that the gradient of refractive index can be achieved in the waveguide array. Thus, in the small variable demultiplexer shown in FIG. 16, the values of voltages $V_1$-$V_7$ placed on respective Si photonic wire waveguides 3 can be changed, whereby the refractive index of each Si photonic wire waveguide 3 can be changed to modulate the refractive index gradient. By this modulation of the refractive index gradient, it is possible to change (switch) the position (port), from which the light is emitted, on the end surface at the end in the Z-axis direction of the waveguide array. This switching using the electro-optical effect achieves a very fast response so that switching can be faster than that by the thermooptic effect in the first embodiment of the invention. Arrangements of the output ports and others can be similar to those in the first embodiment of the small variable demultiplexer according to the invention.

Third Embodiment

Figure 18:
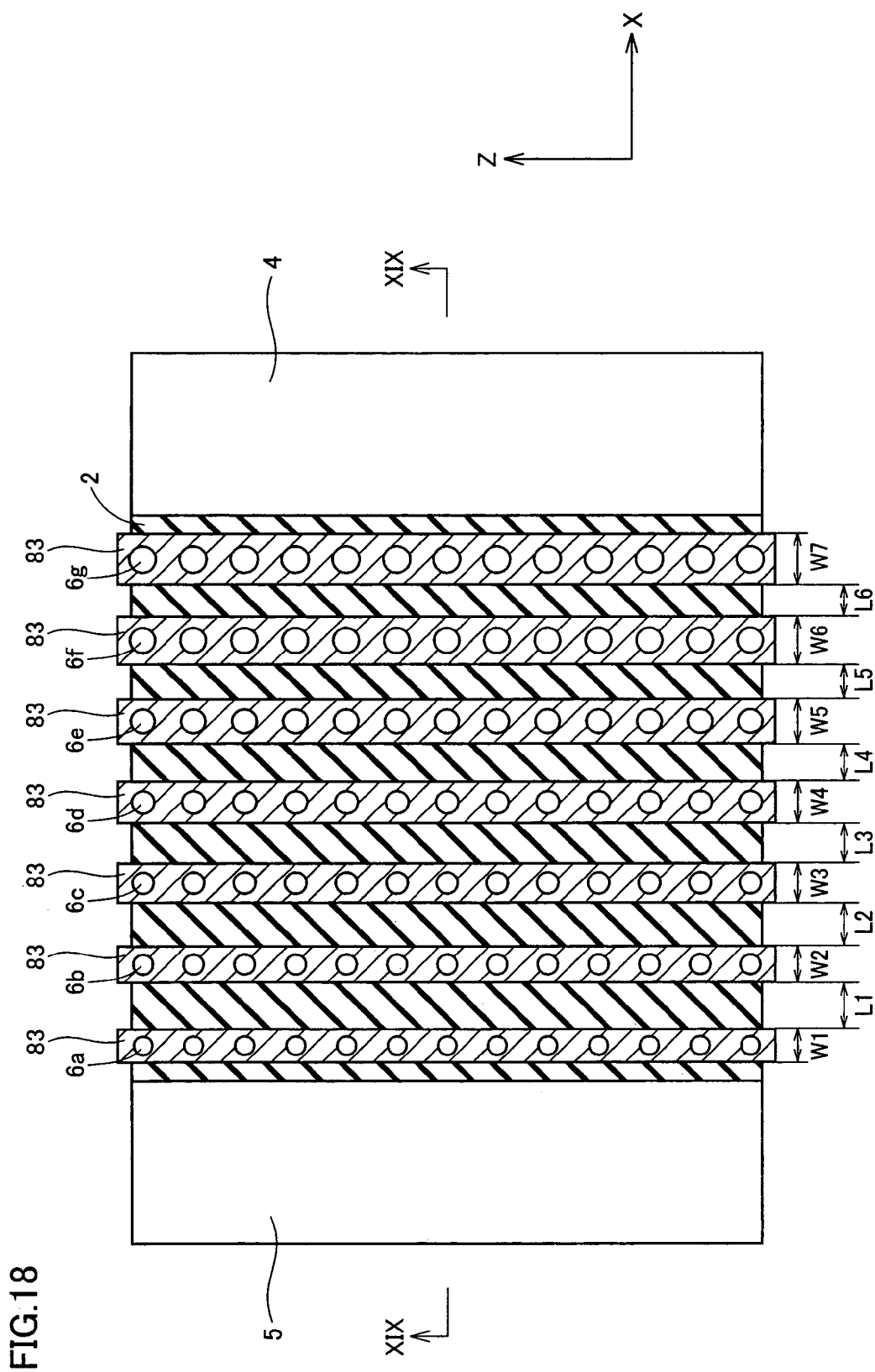
FIG. 18 is a schematic plan showing a third embodiment of the small variable demultiplexer according to the invention.
Figure 19:
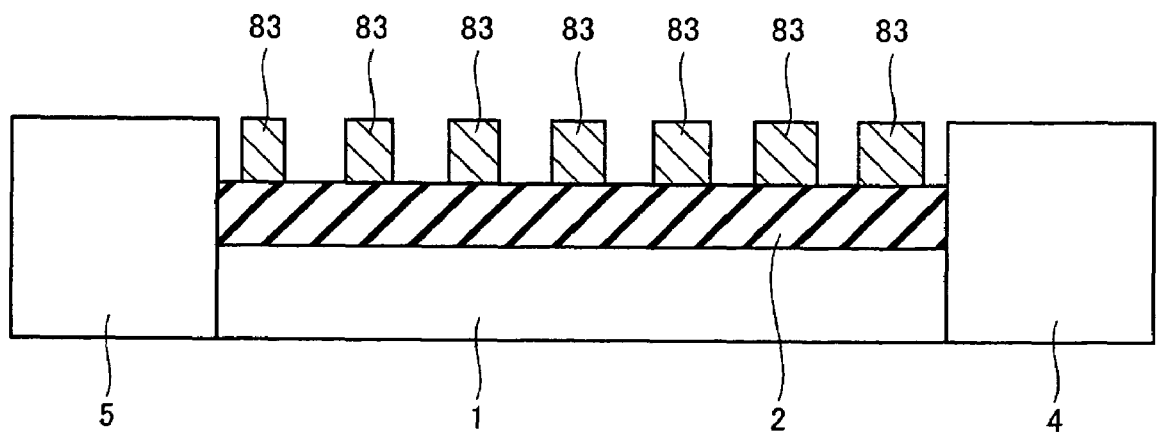
FIG. 19 is a schematic cross section taken along line XIX-XIX in FIG. 18.

Referring to FIGS. 18 and 19, description will now be given on a third embodiment of the small variable demultiplexer according to the invention.

A small variable demultiplexer shown in FIGS. 18 and 19 has substantially the same structure as the small variable demultiplexer shown in FIGS. 1 and 2 except for that widths W1-W7 of Si photonic wire waveguides 83, diameters of empty holes 6a-6g and spaces L1-L6 between neighboring Si photonic wire waveguides 83 are not uniform. Referring to FIG. 18, as the position moves in the X-axis direction from one end of the waveguide array on the left side in FIG. 18 toward the other end, the width (W1-W7) of Si photonic wire waveguide 83 and the diameter of empty hole (6a-6g) gradually increase. Also, the foregoing space (L1-L6) gradually decreases as the position moves in the X-axis direction from the left end toward the right end in FIG. 18. This structure of the waveguide array formed of Si photonic wire waveguides 83 is referred to as a "chirp structure".

In the small variable demultiplexer shown in FIGS. 18 and 19, Si photonic wire waveguides 83 aligned in the above order have widths W1-W7 determined as W1=0.3 μm, W2=0.4 μm, W3=0.5 μm, W4=0.6 μm, W5=0.7 μm, W6=0.8 μm and W7=0.9 μm, respectively. Spaces L1-L6 between the neighboring Si photonic wire waveguides 83 aligned in the above order are determined as L1=0.6 μm, L2=0.5 μm, L3=0.4 μm, L4=0.3 μm, L5=0.2 μm and L6=0.1 μm. Further, the diameters of empty holes 6a-6g aligned in the above order are equal to 0.2 μm, 0.26 μm, 0.33 μm, 0.4 μm, 0.46 μm, 0.53 μm and 0.6 μm, respectively. The structure described above can change the effective refractive indexes of respective Si photonic wire waveguide 83. According to the above structure, Si photonic wire waveguides 83 have the effective refractive indexes of 3.45, 3.46, 3.47, 3.48, 3.49, 3.50 and 3.51, respectively, when aligned in ascending order of the refractive index. Consequently, the above structure achieves the cyclic changes in refractive index and the refractive index gradient in the waveguide array. Widths W1-W7 of Si photonic wire waveguides 83, spaces L1-L6 between neighboring Si photonic wire waveguides 83 and diameters of empty holes 6a-6g may have values other than the above provided that Si photonic wire waveguides 83 can exhibit the refractive index gradient.

The demultiplexing method and switching method in the small variable demultiplexer shown in FIGS. 18 and 19 are basically the same as those in the first embodiment of the small variable demultiplexer shown in FIG. 1. As shown in FIGS. 18 and 19, however, the waveguide array has the chirp structure so that the small variable demultiplexer shown in FIGS. 18 and 19 can achieve the refractive index gradient without using the temperature gradient in contrast to the small variable demultiplexer shown in FIG. 1. The power consumption of heater 4 and heat sink 5 can be smaller than that of the small variable demultiplexer shown in FIG. 1.

In the small variable demultiplexer shown in FIGS. 18 and 19, heater 4 and heat sink 5 as well as the chirp structure achieve the refractive index gradient. However, electrodes may be formed on Si photonic wire waveguides 83 and voltages may be placed thereon for achieving the refractive index gradient, similarly to the second embodiment of the small variable demultiplexer according to the invention shown in FIG. 16. In this case, the chirp structure contributes to formation of the refractive index gradient so that the voltage or power consumption required for obtaining the desired refractive index gradient can be smaller than that of the small variable demultiplexer shown in FIG. 16.

Fourth Embodiment

Figure 20:
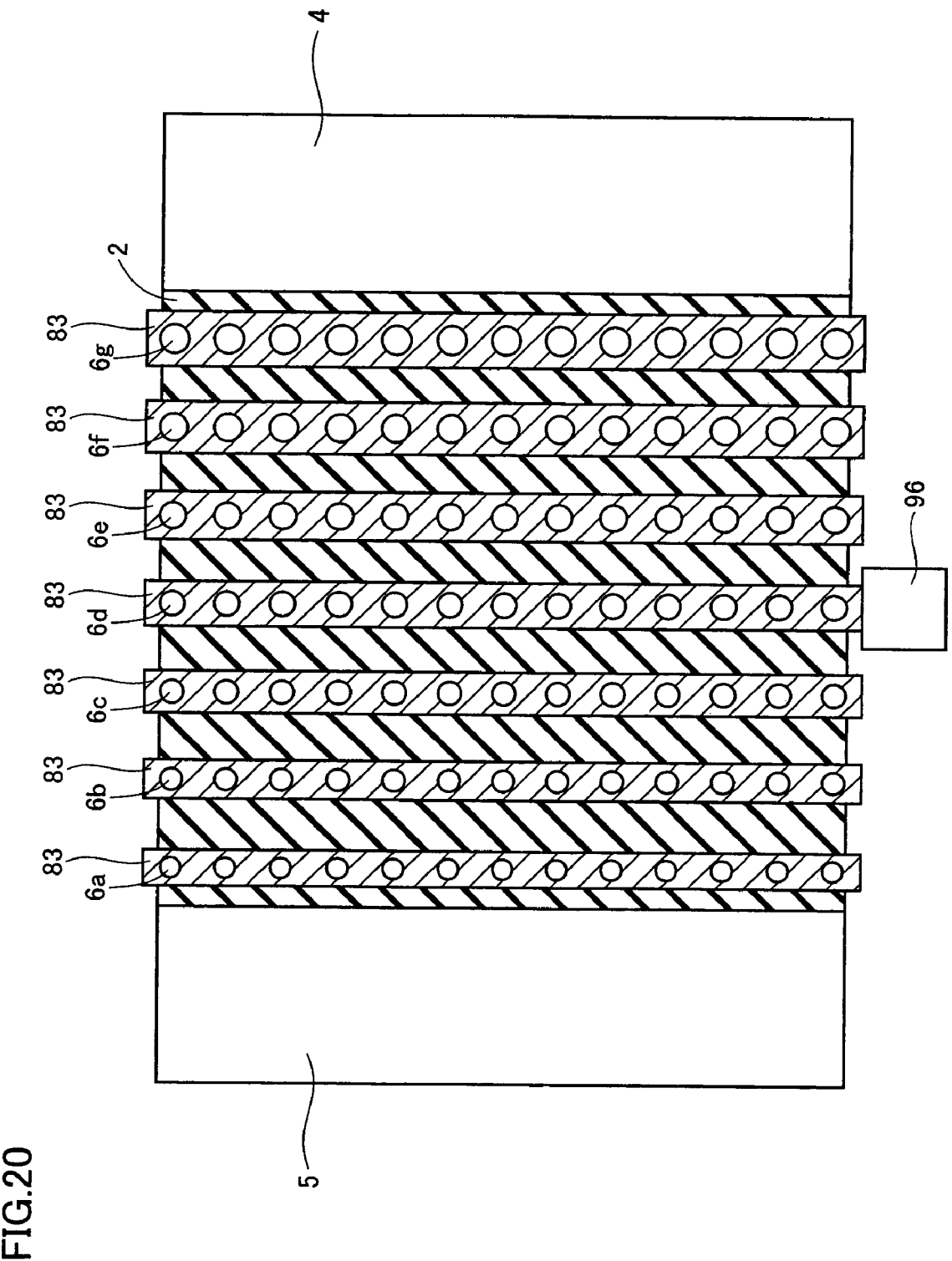
FIG. 20 is a schematic plan showing a fourth embodiment of the small variable demultiplexer according to the invention.

Referring to FIG. 20, a fourth embodiment of the small variable demultiplexer according to the invention will now be described.

The small variable demultiplexer shown in FIG. 20 has basically the same structure as the small variable demultiplexer shown in FIGS. 18 and 19 except for that an SOA (Semiconductor Optical Amplifier) 96 is added to the waveguide array formed of Si photonic wire waveguides 83. In the small variable demultiplexer shown in FIG. 20, SOA 96 is arranged at an end of the waveguide array for emitting the light into the waveguide array.

In the small variable demultiplexer shown in FIG. 20, as the optical amplifying effect of SOA 96 increases the power of the incident light, nonlinear effect is induced. Thereby, the light entering the waveguide array does not follow the linear refractive index gradient, and the propagation path of the light changes. Thus, in the small variable demultiplexer shown in FIG. 20, SOA 96, heater 4 and heat sink 5 can be controlled to perform the switching of the output position (output port) of the light emitted from the waveguide array. The small variable demultiplexer shown in FIG. 20 is prepared by adding SOA 96 to the input port of light in the structure of the third embodiment of the small variable demultiplexer according to the invention shown in FIGS. 18 and 19. Therefore, it is possible to compensate for loss of light when the light is input to the waveguide array, and to perform fast switching. Although heater 4 and heat sink 5 are added as auxiliaries to SOA 96, heater 4 and heat sink 5 may be eliminated. Instead of heater 4 and heat sink 5, the electrodes shown in FIG. 16 may be arranged on Si photonic wire waveguides 83.

Fifth Embodiment

Figure 21:
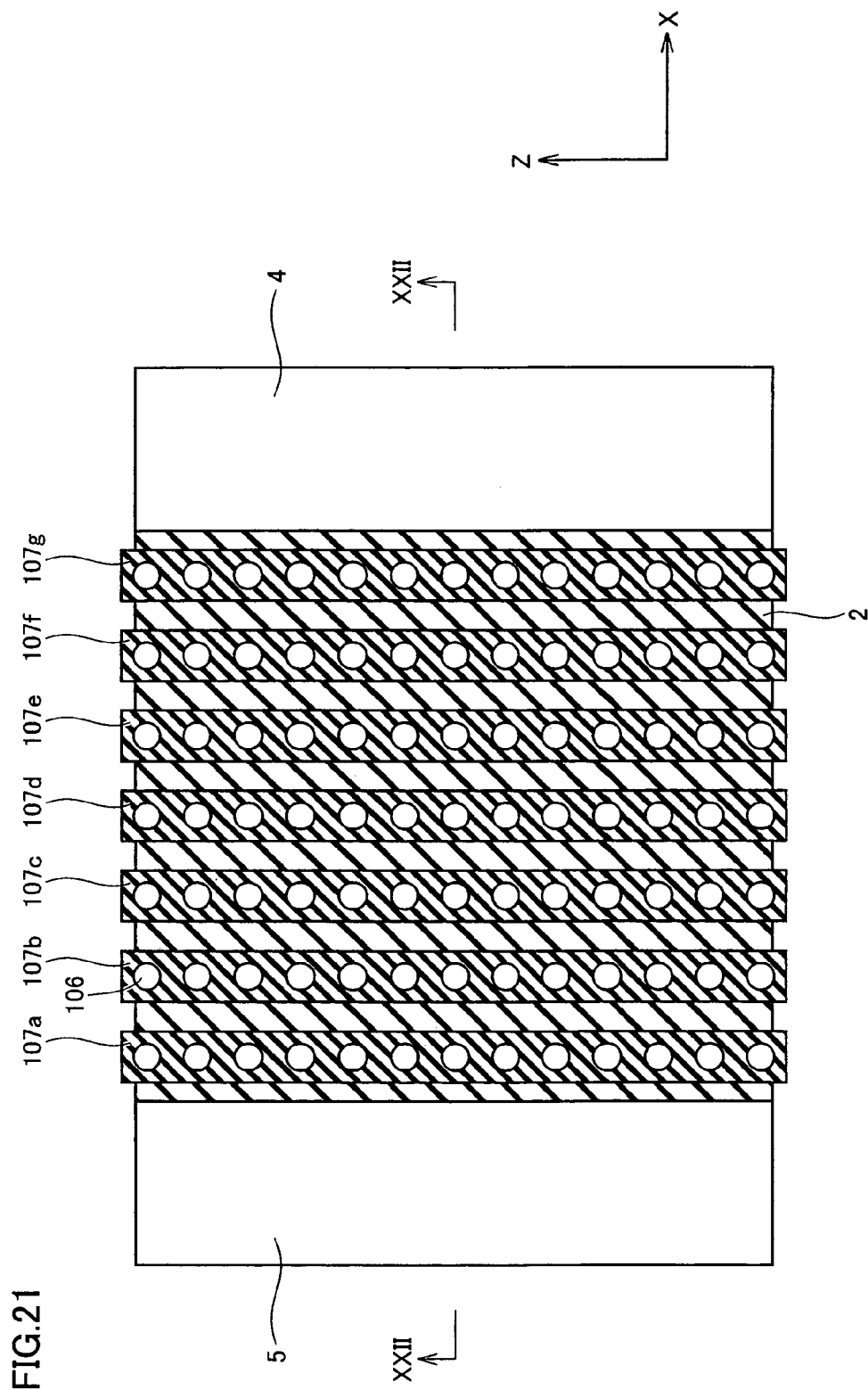
FIG. 21 is a schematic plan showing a fifth embodiment of the small variable demultiplexer according to the invention.
Figure 22:
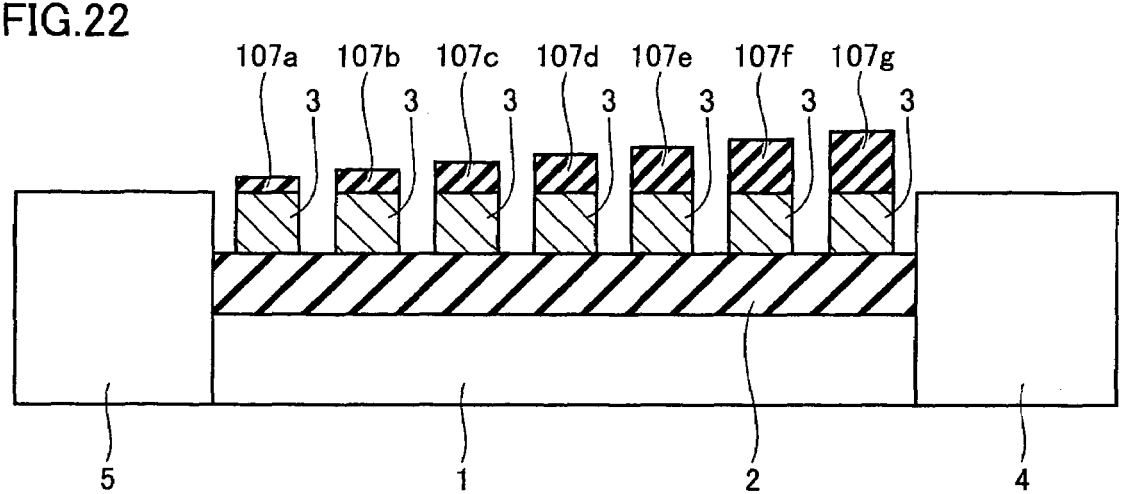
FIG. 22 is a schematic cross section taken along line XXII-XXII in FIG. 21.

Referring to FIGS. 21 and 22, description will now be given on a fifth embodiment of the small variable demultiplexer according to the invention.

A small variable demultiplexer shown in FIGS. 21 and 22 have basically the same structure as the small variable demultiplexer shown in FIGS. 1 and 2 except for that SiN layers 107a-107g are formed on the top surfaces of Si photonic wire waveguides 3, respectively. Empty holes 106 reaching the Si photonic wire waveguide 3 are formed in each of SiN layers 107a-107g. In FIG. 21, the traveling direction of the light is the Z-axis direction, and the direction perpendicular to the direction of extension of Si photonic wire waveguides 3 (SiN layers 107a-107g) is the X-axis direction. The X-axis direction is a oscillation direction of the optical Bloch oscillations.

Description will now be given on the method of producing the small variable demultiplexer shown in FIGS. 21 and 22. In the small variable demultiplexer shown in FIGS. 21 and 22, the SiN layer of 0.25 μm in thickness is uniformly layered over each Si photonic wire waveguide 3 formed of upper silicon layer 13 (see FIG. 4). The above SiN layer having the uniform thickness is formed in such a manner that upper silicon layer 13 is formed of $SiO_2$ layer 2 as shown in FIG. 3, and then the SiN layer of 0.25 μm in thickness is formed. Then, resist film 14 shown in FIG. 3 is formed on the SiN layer, and the exposing and developing processing is performed to form the predetermined pattern of resist film 14 as shown in FIG. 4 and others. Etching is effected on the SiN layer and upper silicon layer 13 masked with resist film 14 to remove them partially so that Si photonic wire waveguides 3 and the SiN layers are formed. Thereafter, the resist film is removed. In this manner, the structure provided with the SiN layers on Si photonic wire waveguides 3 can be obtained.

Then, the small variable demultiplexer provided with the waveguide array formed of Si photonic wire waveguides 3 is processed by immersing Si photonic wire waveguides 3 successively in a hydrogen fluoride solution to effect wet etching on the SiN layer. In this processing, Si photonic wire waveguides 3 are immersed in the hydrogen fluoride solution for different times of 18, 15, 12, 9, 6, 3 and 0 seconds, respectively. Thereby, SiN layers 107a, 107b, 107c, 107d, 107e, 107f and 107g, which are arranged in this order from the left to the right in FIG. 22, have the thicknesses of 0.13 μm, 0.15 μm, 0.17 μm, 0.19 μm, 0.21 μm, 0.23 μm and 0.25 μm, respectively. In the above structure, Si photonic wire waveguides 3 have the effective refractive indexes of 3.45, 3.46, 3.47, 3.48, 3.49, 3.50 and 3.51, respectively, when aligned in the ascending order of the refractive indexes. Respective Si photonic wire waveguides 3 can be immersed in the hydrogen fluoride solution for different times, e.g., in such a manner that a coating film exposing only Si photonic wire waveguides 3 to be immersed is formed on the surface of the small variable demultiplexer, and then the small variable demultiplexer is immersed for predetermined times in the hydrogen fluoride solution. The times for immersion in the hydrogen fluoride solution may take values other than the above provided that the waveguide array formed of Si photonic wire waveguides 3 can have the refractive index gradient.

The refractive indexes of SiN layers 107a-107g are smaller than those of Si photonic wire waveguides 3 formed of the silicon layer, and are larger than the refractive index of air. Therefore, Si photonic wire waveguide 3 provided with SiN layer 107a at the left end can have the smallest effective refractive index, and the effective refractive index gradually can increase as the position moves toward Si photonic wire waveguide 3 provided with SiN layer 107g at the right end. Consequently, it is possible to achieve the cyclic changes in refractive index and the refractive index gradient in the waveguide array.

In the small variable demultiplexer shown in FIGS. 21 and 22, the switching of the output port of the light is performed substantially in the same manner as the small variable demultiplexer shown in FIGS. 1 and 2. However, in the small variable demultiplexer shown in FIGS. 21 and 22, SiN layers 107a-107g are layered on respective Si photonic wire waveguides 3 so that the waveguide array can have the refractive index gradient without using the temperature gradient provided by heater 4 and heat sink 5. Consequently, the power consumption of heater 4 and heat sink 5 can be smaller than that in the small variable demultiplexer shown in FIGS. 1 and 2. As described above, the wet etching with the hydrogen fluoride solution is performed in the step of forming SiN layers 107a-107g. However, another method can be freely used for forming SiN layers 107a-107g. Layers made of a material other than SiN layers 107a-107g may be formed on Si photonic wire waveguides 3. Instead of the thicknesses of SiN layers 107a-107g, the widths of SiN layers 107a-107g, the compositions of the layers on the Si photonic wire waveguides 3 and others may be changed corresponding to the respective Si photonic wire waveguides 3 provided that the effective refractive indexes of Si photonic wire waveguides 3 can be changed.

Sixth Embodiment

Figure 23:
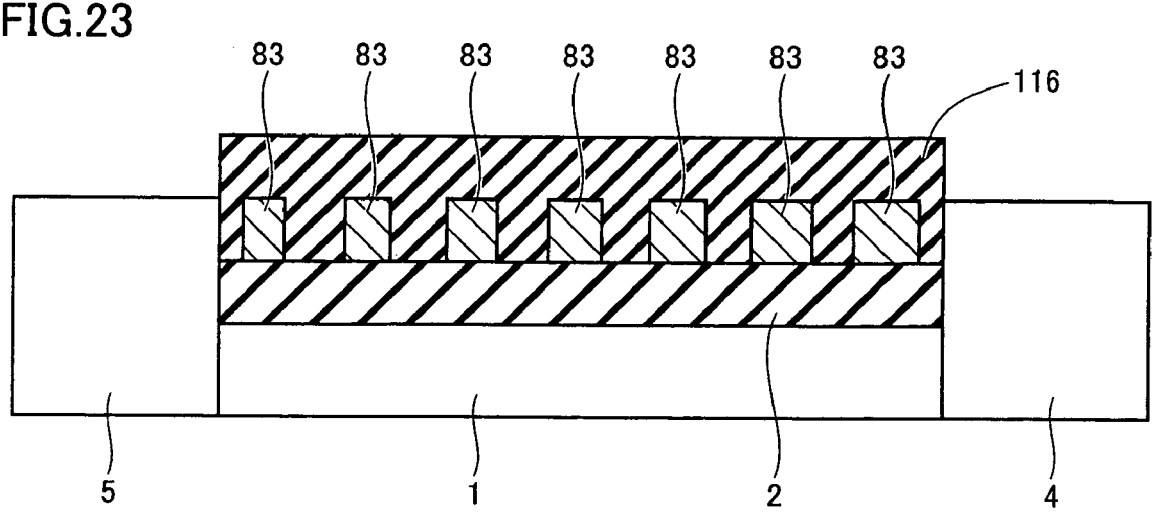
FIG. 23 is a schematic cross section showing a sixth embodiment of the small variable demultiplexer according to the invention.
Figure 24:
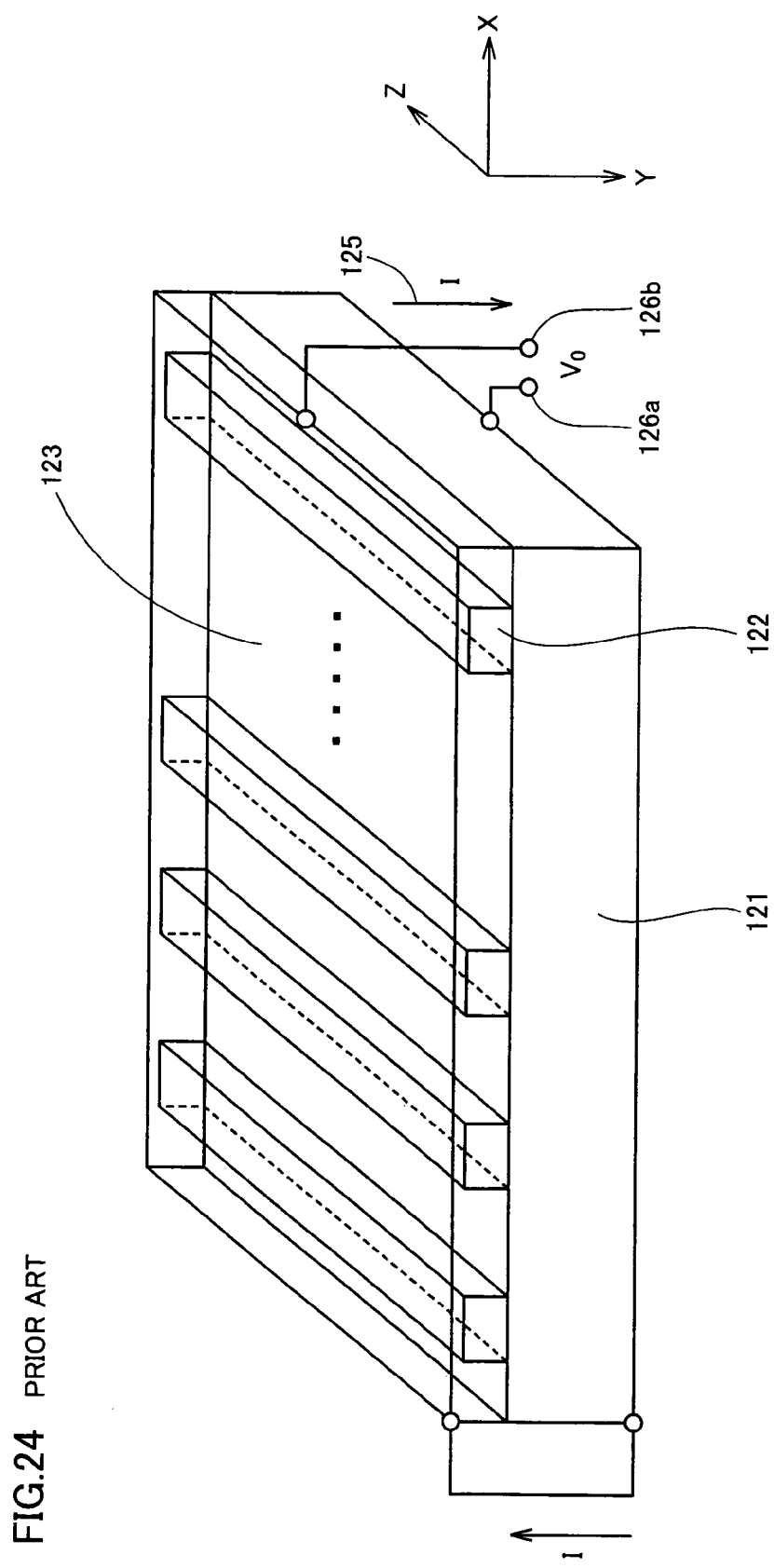
FIG. 24 is a schematic perspective view showing a variable demultiplexer in a prior art.
Figure 25:
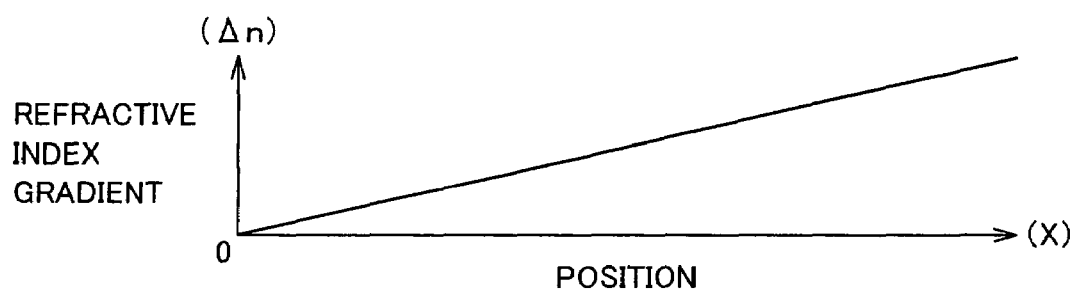
FIG. 25 is a graph illustrating a relationship between a position in an X-axis direction and a refractive index gradient in the variable demultiplexer shown in FIG. 24.
Figure 26:
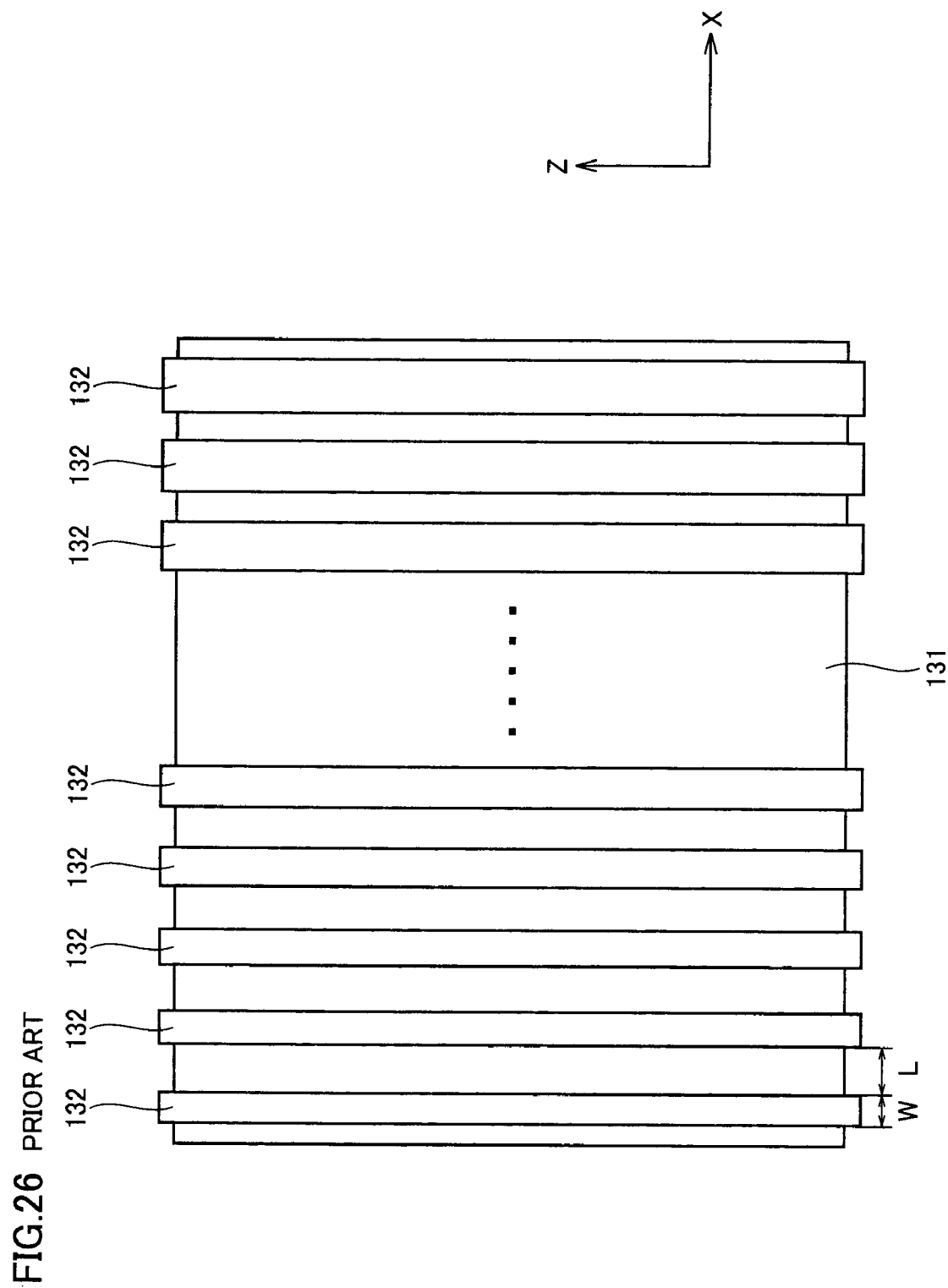
FIG. 26 is a schematic plan showing a variable demultiplexer.

Referring to FIG. 23, description will now be given on a sixth embodiment of the small variable demultiplexer according to the invention. FIG. 23 corresponds to FIG. 19.

The small variable demultiplexer shown in FIG. 23 has basically the same structure as the small variable demultiplexer shown in FIGS. 18 and 19 except for that the waveguide array formed of Si photonic wire waveguides 83 is covered with an $SiO_x$ (0<x<2) layer 116. $SiO_x$ layer 116 fills empty holes 6a-6g (see FIG. 18) formed in Si photonic wire waveguides 83. $SiO_x$ layer 116 has physical properties intermediate the properties of silicon and $SiO_2$, and has the refractive index depending on the value of x. Therefore, by changing the value of x, refractive index difference Δn between Si photonic wire waveguide 83 and $SiO_x$ layer 116 can be freely controlled. Thereby, it is possible to control the extent to which the light leaks into neighboring Si photonic wire waveguide 83 in the waveguide array.

The above structure and manner does not require the processing or working for controlling the etching depth of upper silicon layer 13 by forming remaining portions 21 between neighboring Si photonic wire waveguides 3 as shown in FIG. 13. Thus, in the small variable demultiplexer shown in FIG. 23, the value of x of $SiO_x$ layer 116 is appropriately changed to change refractive index difference Δn between Si photonic wire waveguide 83 and $SiO_x$ layer 116, and thereby the extent of leaking of the light into neighboring Si photonic wire waveguide 83 can be easily controlled.

The distinctive structures of the invention will now be set forth although some of them are already described in connection with the foregoing embodiments.

The small variable demultiplexer serving as the variable demultiplexer according to the invention includes SiO2 layer 2 serving as the base medium, the waveguide array and the external refractive index modulating unit (heater 4 and heat sink 5 in FIG. 1 as well as electrodes 74 in FIG. 16). The waveguide array is arranged on $SiO_2$ layer 2. The waveguide array is formed of the plurality of Si photonic wire waveguides 3 or 83 which have the refractive indexes equal to or larger than that of $SiO_2$ layer 2, and serve as the waveguides. The external refractive index modulating unit forms, in the waveguide array, the refractive index gradient which appears in the direction perpendicular to the extension direction of Si photonic wire waveguides 3 and 83, and is variable between the plurality of Si photonic wire waveguides 3 or 83. Si photonic wire waveguides 3 and 83 have the one-dimensional photonic crystal structure in the extension direction of Si photonic wire waveguides 3 and 83.

According to the above structures, the external refractive index modulating unit, which can control the refractive index gradient in the waveguide array, is employed as a variable mechanism for performing the switching of the output waveguide which is Si photonic wire waveguide 3 or 83 at the position of output of the light. Owing to the one-dimensional photonic crystal structure thus formed in Si photonic wire waveguide 3 or 83 forming the waveguide array, it is possible to lower the group velocity in the traveling direction of the light in Si photonic wire waveguide 3 or 83. Therefore, the element (variable demultiplexer) of small sizes can be produced.

The effect of reducing the sizes of the variable demultiplexer is achieved by the fact that the photonic crystal exhibits the dispersing relationship of the light different from that of an ordinary medium. Thus, the dispersing relationship of the light is modulated by the periodicity of the photonic crystal, and the inclination of the band at a band edge near a PBG (Photonic Bang Gap) is small so that the group velocity of the light can be very low. Thus, by forming the one-dimensional photonic crystal structure reducing the group velocity with respect to the wavelength of the light passing through the waveguide array, it is possible to lower the group velocity in the traveling direction of the light. Thereby, one cycle propagation length of the optical Bloch oscillations can be short so that the sizes of the variable demultiplexer can be reduced. Consequently, the chip forming each variable demultiplexer can be produced by the EB exposure within one field so that a boundary between the fields is not located within the chip forming the variable demultiplexer. Accordingly, it is possible to prevent deterioration of the characteristics of the variable demultiplexer due to such a boundary. Consequently, the characteristics of the variable demultiplexer are stable, and the yield of the variable demultiplexer is improved.

In the above small variable demultiplexer, the external refractive index modulating unit may include heater 4 serving as a heating member and a heat sink 5 serving as a cooling member as shown in FIG. 1 and others. Heater 4 may be located at one end in the direction (X-axis direction) perpendicular to the extension direction of Si photonic wire waveguides 3 or 83 in the waveguide array. Heater 4 heats Si photonic wire waveguides 3 or 83. Heat sink 5 is located at the other end remote from the above one end in the waveguide array, and cools Si photonic wire waveguides 3 or 83. In this case, the refractive index gradient of the waveguide array can be easily changed only by controlling heater 4 and heat sink 5.

In the small variable demultiplexer described above, the external refractive index modulating unit may include the plurality of electrodes 74 as shown in FIG. 16. The plurality of electrodes 74 are connected to the plurality of Si photonic wire waveguides 3, respectively. In the small variable demultiplexer, the external refractive index modulating unit may include a power supply 75 as a power supply member. Power supply 75 may be configured to apply different voltages to the plurality of electrodes 74, respectively.

In the above case, the predetermined voltages are applied (by power supply 75) to electrodes 74 connected to Si photonic wire waveguides 3 to cause the voltage gradient in the waveguide array, respectively, so that the refractive index gradient can be produced in the waveguide array. By using electrodes 74 as described above, turn-on/off of the voltage application for generating the refractive index gradient can be performed very rapidly. Thus, the control of the refractive index gradient can be performed more rapidly than the case of utilizing the thermal conditions by using heater 4 and heat sink 5. Consequently, the switching of the output waveguide (Si photonic wire waveguide 3 forming the output port for outputting the light) can be performed more rapidly than the case of using heater 4 and heat sink 5.

In the small variable demultiplexer described above, Si photonic wire waveguide 3 may be a coupled-defect waveguide prepared by cyclically introducing defects (donor type defects 61 or acceptor type defects 62) into the on-direction phonic crystal structure as shown in FIGS. 14 and 15. This structure can further lower the group velocity in the traveling direction of the light in Si photonic wire waveguide 3. Consequently, the size of the small variable demultiplexer can be further reduced.

In the small variable demultiplexer, as shown in FIG. 18 and others, the waveguide array may have the chirp structure which includes Si photonic wire waveguides 83 having widths W1-W7 gradually increasing as the position moves from one end (i.e., end neighboring to heat sink 5 in FIG. 18) to the other end (i.e., end neighboring to heater 4) in the direction (X-axis direction) perpendicular to the extension direction (Z-axis direction) of Si photonic wire waveguide 83, and being spaced from each other by spaces L1-L6 gradually decreasing as the position moves from the above one end to the other end.

In the above case, the waveguide array having the chirp structure can form the refractive index gradient therein even when the external refractive index modulating unit is not employed. Therefore, in the structure of using heater 4, heat sink 5, electrodes 74 or the like as the external refractive index modulating unit, the power consumption for generating the predetermined refractive index gradient by heater 4, heat sink 5, electrodes 74 and others can be smaller than that of the structure not using the chirp structure.

In the foregoing small variable demultiplexer, the waveguide array may include SiN layers 107a-107g as the medium layer arranged over the Si photonic wire waveguides 3 as shown in FIG. 21. SiN layers 107a-107g provided as the medium layer have the smaller refractive index than the material (silicon) forming Si photonic wire waveguide 3. The thicknesses of SiN layers 107a-107g provided as the medium layer have the thicknesses gradually increasing as the position moves from one end (i.e., end neighboring to heat sink 5) to the other end (i.e., end neighboring to heater 4) in the direction (X-axis direction) perpendicular to the extension direction (Z-axis direction) of Si photonic wire waveguide 3. The medium layer may be made of any material having a smaller refractive index than the material of Si photonic wire waveguide 3.

In the above case, the provision of SiN layers 107a-107g can form the refractive index gradient even in the waveguide array not using the external refractive index modulating unit. Therefore, in the case where heater 4, heat sink 5, electrodes 74 or the like are used as the external refractive index modulating unit, the power consumption of heater 4, heat sink 5, electrodes 74 and others required for generating the predetermined refractive index gradient can be smaller than that in the case where SiN layers 107a-107g are not formed.

In the small variable demultiplexer described above, the waveguide array may have remaining portions 21 arranged between the plurality of Si photonic wire waveguides 3 as shown in FIG. 12.

This structure can reduce refractive index difference Δn between the refractive index of Si photonic wire waveguide 3 and the refractive index of the gap between neighboring Si photonic wire waveguides 3. Further, by changing the thickness of remaining portions 21, it is possible to change freely the effective refractive index on the section (i.e., section taken along dotted line 42 in FIG. 13) including remaining portion 21 so that the value of refractive index difference Δn can be freely changed. Thereby, it is possible to adjust significantly the extent to which the light leaks into neighboring Si photonic wire waveguide 3.

In the above small variable demultiplexer, the waveguide array may include $SiO_x$ layer 116 serving as the coating layer formed over the plurality of Si photonic wire waveguides 83 as shown in FIG. 23. From the viewpoint of confining the light, it is preferable that $SiO_x$ layer 116 serving as the coating layer is made of a material having a smaller refractive index than the material forming Si photonic wire waveguide 83. The coating layer may be made of a material other than $SiO_x$ provided that it has a smaller refractive index than the material forming Si photonic wire waveguide 83.

In the above case, the composition and/or the like of the material forming $SiO_x$ layer 116 ($0<x<2$) serving as the coating layer may be controlled to change the characteristics of the material, whereby refractive index difference Δn between the waveguide array and $SiO_x$ layer 116 can be adjusted. For example, the value of composition x of O (oxygen) in $SiO_x$ can be freely changed so that the refractive index of $SiO_x$ layer 116 can be easily changed. Consequently, it is possible to control easily the extent of leaking of the light into neighboring Si photonic wire waveguide 83.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A variable demultiplexer comprising:
   a base medium;
   a waveguide array formed of a plurality of waveguides arranged on said base medium, and having a refractive index larger than or equal to a refractive index of said base medium; and
   an external refractive index modulation unit forming in said waveguide array a refractive index gradient variable between said plurality of waveguides in a direction perpendicular to an extension direction of said waveguide, wherein
   said waveguide has a one-dimensional photonic crystal structure in the extension direction of said waveguide.

2. The variable demultiplexer according to claim 1, wherein
   said external refractive index modulation unit includes:
   a heating member located at one end in a direction perpendicular to the extension direction of said waveguide in said waveguide array, and heating said waveguide, and
   a cooling member located at the other end remote from said one end in said waveguide array, and cooling said waveguide.

3. The variable demultiplexer according to claim 1, wherein
   said external refractive index modulation unit includes a plurality of electrodes connected to said plurality of waveguides, respectively.

4. The variable demultiplexer according to claim 1, wherein
   said waveguide is a coupled-defect waveguide having defects cyclically introduced into said one-dimensional photonic crystal structure.

5. The variable demultiplexer according to claim 1, wherein
   said waveguide array has such a chirp structure that widths of the waveguides gradually increase, and spaces between the neighboring waveguides gradually decrease as the position moves from one end in a direction perpendicular to the extension direction of said waveguides of the waveguide array to the other end.

6. The variable demultiplexer according to claim 1, wherein
   said waveguide array includes a medium layer formed of a material having a smaller refractive index than the material forming said waveguide, and being layered on said waveguides, and
   a thickness of said medium layer gradually increases as the position moves from one end in a direction perpendicular to the extension direction of said waveguides to the other end.

7. The variable demultiplexer according to claim 1, wherein
   said waveguide array includes a coating layer formed of a material having a smaller refractive index than the material forming said waveguide, and being formed over said plurality of waveguides.

8. The variable demultiplexer according to claim 7, wherein
   said coating layer is made of $SiO_x$ ($0<x<2$).

* * * * *